US007739653B2

(12) United States Patent
Venolia

(10) Patent No.: US 7,739,653 B2
(45) Date of Patent: Jun. 15, 2010

(54) REPRESENTING SOFTWARE DEVELOPMENT ITEM RELATIONSHIPS VIA A GRAPH

(75) Inventor: Gina D. Venolia, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1379 days.

(21) Appl. No.: 11/175,568

(22) Filed: Jul. 5, 2005

(65) Prior Publication Data

US 2007/0011659 A1 Jan. 11, 2007

(51) Int. Cl.
G06F 9/45 (2006.01)
(52) U.S. Cl. ...................................................... 717/101
(58) Field of Classification Search .................. 717/101
See application file for complete search history.

(56) References Cited

U.S. PATENT DOCUMENTS

| | | | | |
|---|---|---|---|---|
| 6,026,362 A | * | 2/2000 | Kim et al. | 705/1 |
| 6,285,999 B1 | | 9/2001 | Page | |
| 6,763,360 B2 | * | 7/2004 | Hartley | 707/102 |
| 7,051,316 B2 | * | 5/2006 | Charisius et al. | 717/103 |
| 7,418,697 B2 | * | 8/2008 | Gryko et al. | 717/124 |
| 2002/0023257 A1 | * | 2/2002 | Charisius et al. | 717/2 |
| 2002/0032900 A1 | * | 3/2002 | Charisius et al. | 717/2 |
| 2002/0087950 A1 | * | 7/2002 | Brodeur et al. | 717/124 |
| 2002/0180689 A1 | | 12/2002 | Venolia | |
| 2002/0186257 A1 | | 12/2002 | Cadiz et al. | |
| 2002/0188448 A1 | | 12/2002 | Goodman et al. | |
| 2003/0164862 A1 | | 9/2003 | Cadiz et al. | |
| 2005/0204343 A1 | * | 9/2005 | Kisamore et al. | 717/124 |
| 2006/0136904 A1 | * | 6/2006 | Weidman et al. | 717/172 |

OTHER PUBLICATIONS

"Search Beyond Google," www.technewsworld.com, posted to addict3d.org, 10 pages, Feb. 3, 2004.
"The Perforce SCM System," http://www.perforce.com/perforce/products.html, 2 pages, visited on May 24, 2005.
Cadiz et al., "Designing and Deploying an Information Awareness Interface," *Proceedings of the 2002 ACM Conference on Computer Supported Cooperative Work*, pp. 314-323, 2002.
Čubranić et al., "Hipikat: Recommending Pertinent Software Development Artifacts" *Proceedings of the 25th International Conference on Software Engineering (ICES '03)*, IEEE Computer Society, 11 pages, 2003.
Dumais et al., "Stuff I've Seen: A System for Personal Information Retrieval and Re-Use," Microsoft Research, SIGIR '03, 7 pages, Aug. 1, 2003.
Dumais, "Beyond Content-Based Retrieval: Modeling Domains, Users, and Interaction," Keynote address at *IEEE: Advances in Digital Libraries '99*, 44 pages, May 19-21, 1999.

(Continued)

Primary Examiner—John Chavis
(74) Attorney, Agent, or Firm—Klarquist Sparkman, LLP

(57) ABSTRACT

Software development items can be represented in a graph data structure. Relationships between the represented items can be detected and reflected in the graph data structure. Queries can be run against the data structure to determine which software development items are related to each other. Implicit query can be implemented in a software development context. A graph browser can present panes showing related items.

15 Claims, 29 Drawing Sheets

OTHER PUBLICATIONS

Fremuth-Paeger, "GOBLIN: A Graph Object Library for Network Programming Problems," http://www.math.uni-augsburg.de/opt/goblin.html, 13 pages, visited May 20, 2005.

Kaiser et al., "An Architecture for Intelligent Assistance in Software Development," *Proceedings of the 9th International Conference on Software Engineering*, pp. 180-187, 1987.

Kanellos, "Microsoft aims for search on its own terms," www.CNET News.com, 4 pages, Nov. 24, 2003.

Mathys, "A graph browser for large directed graphs," *Proceedings of the 1992 ACM/SIGAPP Symposium on Applied Computing: Technological Challenges of the 1990's* ISBN:0-89791-502-X, pp. 476-481, 1992.

Siracusa, "Mac OS X 10.0," arstechnica, http://arstechnica.com/reviews/01q2/macos-x-final/macos-x-10.html, 6 pages, visited May 20, 2005.

Sullivan, "Microsoft researchers discuss forthcoming end-user .NET functionality," http://www.infoworld.com/articles/hn/xml/01/09/05/010905hnmsfuture.html, 4 pages, Sep. 5, 2001.

Venolia et al., "Understanding Sequence and Reply Relationships Within Email Conversations: A Mixed-Model Visualization," Technical Report, MSR-TR-2002-102, 9 pages, Sep. 23, 2002, Revised Jan. 13, 2003.

Yurko, "Search the Web Without Searching," *PC World*, 2 pages, Feb. 11, 2000.

\* cited by examiner

...
SOMEWHERE IN THE PLAIN TEXT, PERHAPS BURIED, IS A MENTION OF A SOFTWARE DEV ITEM, BUT THE DOCUMENT MAY NOT BE STRUCTURED SO THAT THE ITEM APPEARS IN A PREDICTABLE LOCATION.
...

1410

1500

RE: INDEX NOT WORKING

FROM: GINAV
TO: DEVB
WHAT IS GOING ON WITH
ISERVEREXTENSION.NEWQUERY? BUG 50
HAS BEEN OPEN FOR OVER A DAY. 24
HOURS WITHOUT THE INDEX IS NOT GOOD.
DOES THE DEV NEED HELP ON THIS ONE?
THANKS,
GINA

| RE: BUG 57 CLOSED |
|---|
| FROM: GINAV<br>TO: DEVB<br>CC: DEVC<br>WOW, THAT BUG IS FIXED ALREADY? THE LAST TIME WE HAD TROUBLE WITH THE INDEX, IT TOOK TWO DAYS TO FIX ISERVEREXTENSION.NEWQUERY. I GUESS OUR NEW TOOLS ARE HELPING THE DEVS.<br><br>GINA                                                                     1600 |

...
I THOUGHT THAT BUG 153 WAS A
CINCH TO FIX
...

...
AS OF TODAY, ACCOUNT.ADD
ISN'T WORKING AGAIN. CAN YOU
CHECK THE . . .
...

1760

SOFTWARE 2980 FOR TECHNOLOGY
DESCRIBED IN EXAMPLE(S)

REPRESENTING SOFTWARE DEVELOPMENT ITEM RELATIONSHIPS VIA A GRAPH

BACKGROUND

Developing software can be difficult, especially when coordinating many software development tasks within a group of developers. Typically, different developers spend their time planning, writing or revising different parts of the software project. Some developers may be tracking down bugs, others are fixing the bugs, and still others may be adding new features to the software. Communication between developers is critical to coordinate efforts because no single developer can possibly know every detail about the project.

During the development process, a developer often wishes to become familiar with the history of a piece of code. Knowing how the code fits in with the rest of the project can help determine how the developer proceeds when modifying the code. So, for example, the developer might want to know who on the development team is most familiar with the code.

However, determining which of the developers to contact is not always easy. For example, the code may have been modified by a variety of developers for a variety of reasons. The developer might consult a number of sources, such as emails, the source code store, and a bug tracking database. However, it may be difficult or impossible to find an answer via these resources because of the time required to sift through them.

On a large project, one of the developers may take up the role of project historian. The historian can be a valuable resource who can recount which developers worked on what code and can identify the developers who are most likely to be familiar with a particular issue or piece of code. However, even the historian cannot possibly know the entire history of the software project and may eventually leave the development team to pursue other projects. Further, if the software team is separated geographically, it may be impossible to consult the historian in a face-to-face conversation.

SUMMARY

Software development items and the relationships among them can be represented in a graph data structure.

When a request to indicate software development items related to a specified software development item is received, results indicating the software development items related to the specified development item can be presented. For example, a graph can be consulted.

Implicit query can be used in a software development context. For example, a search of a graph can be performed.

A graph browser can present items represented as nodes in a graph.

The foregoing and other features and advantages will become more apparent from the following detailed description of disclosed embodiments, which proceeds with reference to the accompanying drawings.

BRIEF DESCRIPTION OF THE FIGURES

FIG. 17A is a block diagram showing exemplary recognition of a mention of a bug within plain text.

FIG. 17B is a block diagram showing exemplary recognition of a mention of a method within plain text.

DETAILED DESCRIPTION

Example 1

Exemplary System Employing a Combination of the Technologies

Figure 1:
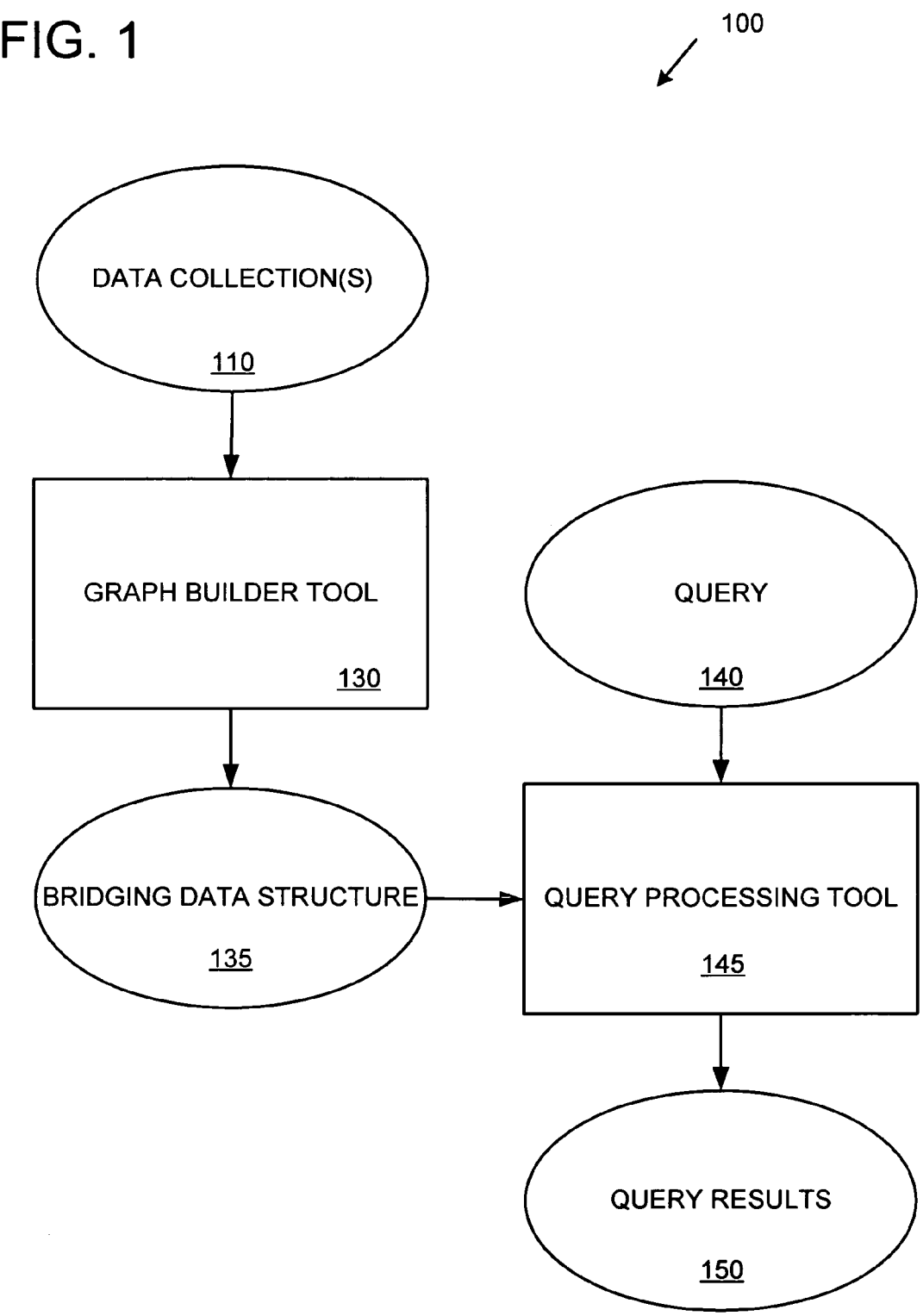
FIG. 1 is a block diagram of an exemplary system employing a combination of the technologies described herein.

FIG. 1 is a block diagram of an exemplary system 100 employing a combination of the technologies described herein. Such a system 100 can be provided separately or as part of a software development environment. In the example, a graph builder tool 130 takes one or more data collections 110 as input and generates a bridging data structure 135 representing software development items and relationships between them. The bridging data structure 135 is sometimes called an "index" and can include any of a variety of forms (e.g., a graph represented by a database or other data structure). A query tool 145 makes use of the bridging data structure 135 when it accepts a query 140 for software development items. In response to the query 140, the query tool 145 generates the query results 150.

Example 2

Exemplary System Employing a Combination of the Technologies

Figure 2:
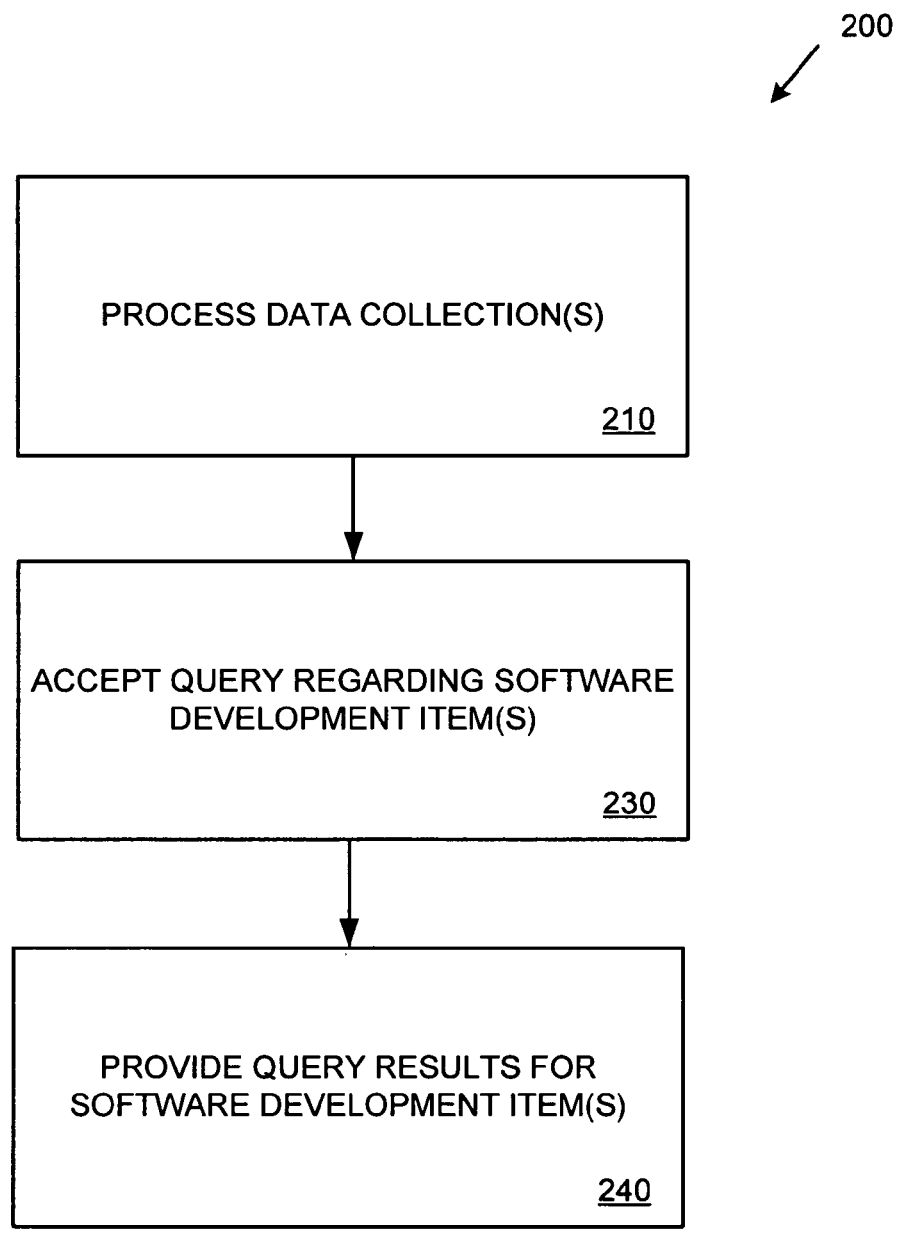
FIG. 2 is a flowchart of an exemplary method employing a combination of the technologies described herein and can be implemented in a system such as that shown in FIG. 1.

FIG. 2 is a flowchart of an exemplary method 200 employing a combination of the technologies described herein and can be implemented in a system such as that shown in FIG. 1. In the example, at 210 the one or more data collections (e.g., the data collections 110 of FIG. 1) are processed. As described herein, the processing can include generating a graph data structure (e.g., the bridging data structure 135) representing software development items and relationships between them.

At 230, a query is accepted regarding one or more software development items. In any of the examples described herein, a query can be determined via explicit or implicit techniques.

At 240, results of the query can be provided to indicate software development items as determined via the query.

Example 3

Figure 3:
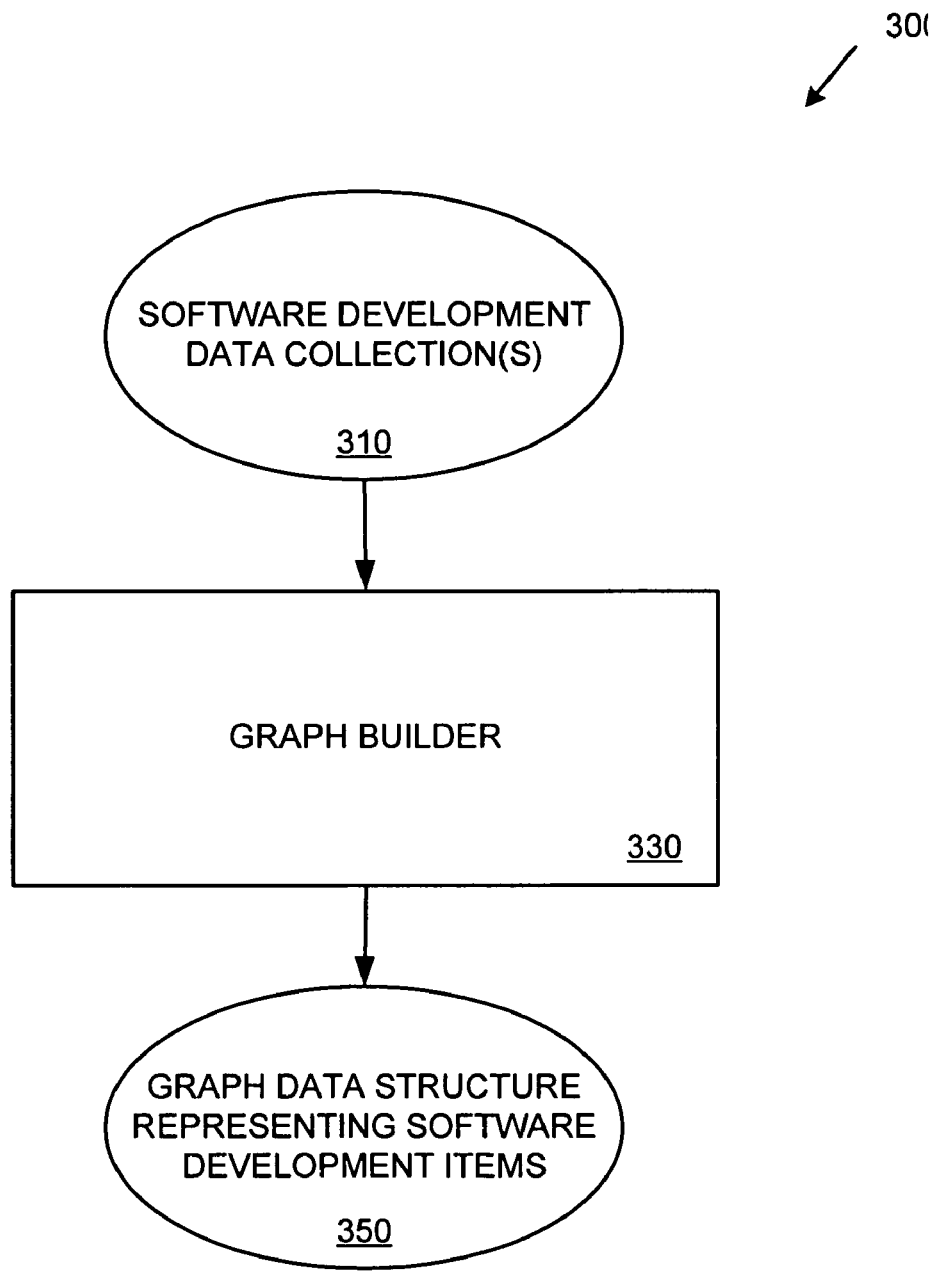
FIG. 3 is a block diagram of a system generating a graph data structure representing software development items based on one or more software development data collections.

Exemplary System Generating a Graph Data Structure Representing Software Development Items FIG. 3 is a block diagram of a system 300 generating a graph data structure representing software development items based on one or more software development data collections. In the example, a graph builder tool 330 can accept one or more software development data collections as input 310 and generate a graph data structure 350 representing software development items based on (e.g., detected in or mentioned in) the data collections 310. The graph builder tool 330 can be a creator of the graph 350, a modifier of the graph 350, or both.

Example 4

Figure 4:
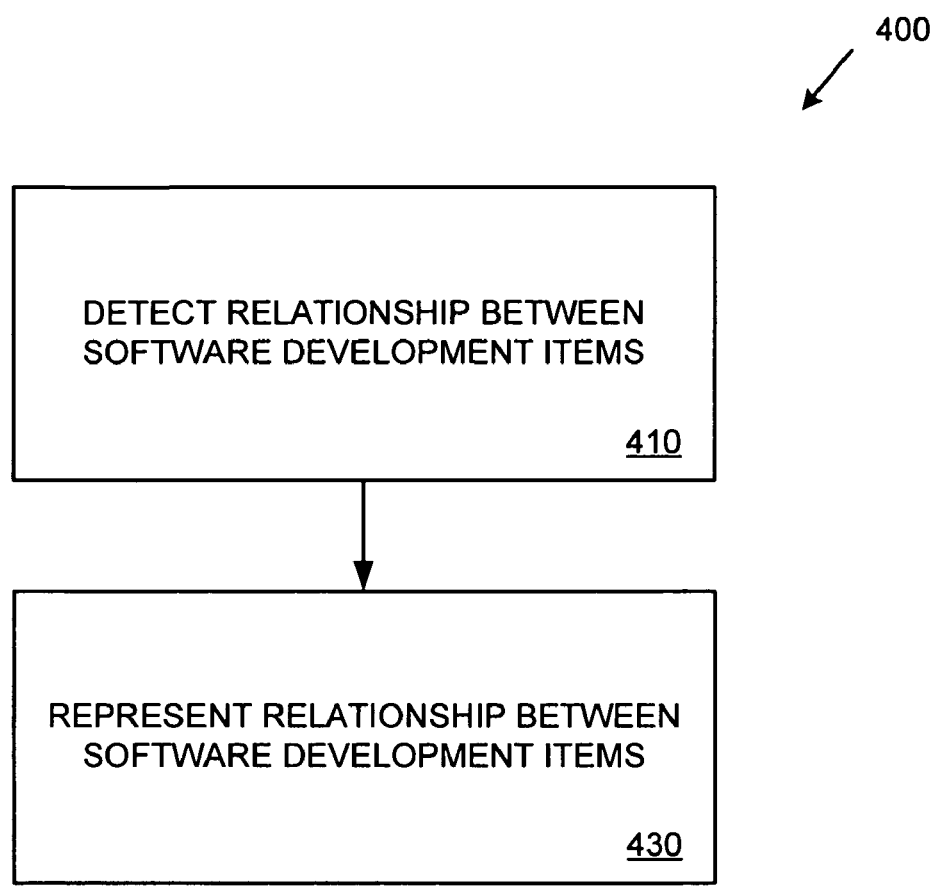
FIG. 4 is a flowchart of an exemplary method of building a data structure that represents relationships between software development items and can be used in a system such as that shown in FIG. 3.

Exemplary Method of Generating a Graph Data Structure Representing Software Development Items FIG. 4 is a flowchart of an exemplary method of building a graph data structure that represents relationships between software development items and can be used in a system such as that shown in FIG. 3. In the example, at 410, a relationship is detected (e.g., in a data collection) for a plurality of the software development items represented in the graph. At 430, the relationship between the software development items is represented. Such relationships can be represented by modifying the graph data structure. Modification can include addition one or more nodes, adding one or more edges, changing values for one or more nodes, changing values for one or more edges, or some combination thereof.

In practice, a method generating a graph data structure can also create nodes representing the software development items based on (e.g., detected in or mentioned in) a data collection.

Example 5

Exemplary Software Development Items

In any of the examples described herein, a variety of software development items can be represented. Software development items can include any identifiable item related to software development.

For example, software development items can include programming language constructs such as object classes, methods, structures, enumerated types, enumerated type constants, and the like.

Software development items can also include the developers working on the software. Such developers can be identified by a plain language name, a user name, or an email address or alias.

Other software development items can include items tracked during the development process, such as software bugs, code check-ins, changes to source code, software features, and the like.

Further, specifications or other documents containing information on the software being developed can be included as software development items. For example, files such as word processing documents, spreadsheets, slide shows, and the like can be software development items. And, the locations of documents (e.g., file paths or URLs) can also be software development items.

Also, emails sent by a developer or containing information on any of the other software development items can be software development items and represented accordingly.

Example 6

Exemplary Data Collections

A data collection can include any collection of data related to software development. In practice, such data collections can include an email database associated with communications between developers, a bug tracking database, an issue tracking database, a source code store, and other databases or data collections.

In addition, one or more documents (e.g., word processing documents, spreadsheets, slide shows, and the like) can be a data collection.

A data collection can include structured information, unstructured information, semi-structured information, or some combination thereof. Further, a data collection can include plain text. Any data collection can serve as a source of information from which nodes are created (e.g., by a graph builder tool) to represent the software development items detected or mentioned therein.

Example 7

Exemplary Relationships

In any of the examples herein, nodes representing software development items can be indicated as related, thus indicating a relationship between the represented software development items. For example, an edge can connect two nodes to indicate that the two represented software development items are related. Such a node may or may not indicate the type of relationship.

Examples of possible relationships include contains, mentions, received, sent, has a reply, authored, etc. Such relationships may be directed. A reverse direction may indicate a reciprocal relationship (e.g., contained by, mentioned in, received by, sent by, is a reply to, authored by, etc.)

Relationships can be between two different types of nodes. For example, a software developer can be related to a software development item other than a developer.

Relationships can take the form of explicit relationships, implicit-but-exact relationships, ambiguous relationships (e.g., with an associated confidence score), textual relationships, and textual allusion relationships.

Relationships can be direct or indirect. For example, an email may directly indicate its sender and what was mentioned in the email. The sender is thus indirectly indicated as related to what was mentioned in the email. In this way, if two bugs are mentioned by a same sender, the two bugs are indirectly indicated related.

Example 8

Exemplary Plain Text

In any of the examples herein, plain text can include any natural language text that is meant to be read by a human being. Examples of plain text include the text of emails, email subjects lines, notes fields, comments fields, description fields, and the like. Plain text can also be found in word processing documents, spreadsheets, slide shows, and the like. Mentions of software development items (e.g., identifiers, names, and the like) can appear in plaintext documents. Upon detection of such mentions, a graph data structure can be updated (e.g., an edge can be created) to indicate that the software development item was mentioned in a portion of the plain text.

In addition, in the software development context, plain text can appear in source code, bug reports, bug resolution descriptions, notes associated with source code check-ins, and the like.

In any of the examples herein, the technologies applied to plain text can also be applied to linguistic text, such as any text that is intended to be read by users in a natural language (e.g., English, Italian, Chinese, and the like).

Because a graph data structure can indicate the plain text mentions of software development items, it is possible that two different software development items are mentioned in the same portion plain text (e.g., an email body). In such a case, two edges (e.g., one for each software development item) may connect to a same node (e.g., representing the email) to indicate that the two software development items were mentioned in the same portion of plain text. In this way, the two items are related in the graph data structure. Such a relationship may be helpful when attempting to research either of the software development items during development (e.g., to learn that the two development items are somehow connected).

Example 9

Exemplary Disconnected Data Collections

In any of the examples herein, two or more of the data collections can be disconnected. A disconnected data collection can include any data collection that is logically stored separately from another data collection. Separate storage can also be characterized by different formats for storing the data, different clients for accessing the data, different clients for searching the data, different clients for querying the data, a different protocol for accessing the data, or other heterogeneous characteristics. Such disconnected data collections are sometimes called "data silos" because the data is effectively shielded from full connectivity with data in other silos. For example, the application used with one data silo typically cannot access or query the data in another silo. Thus, one query cannot pull data from both silos. Email databases are typically disconnected from any other data collection. Thus, email and a non-email data collection are considered to be disconnected.

Examples of disconnected data collections include an email database and a bug tracking database; an email database and a source code management database; a source code management database and a bug tracking database; and a bug tracking database and an email database. A disconnected data collection can also take the form of one or more unstructured documents (e.g., a word processing document, a spreadsheet, a slide show, or the like).

Example 10

Exemplary System Bridging Disconnected Data Collections

Figure 5:
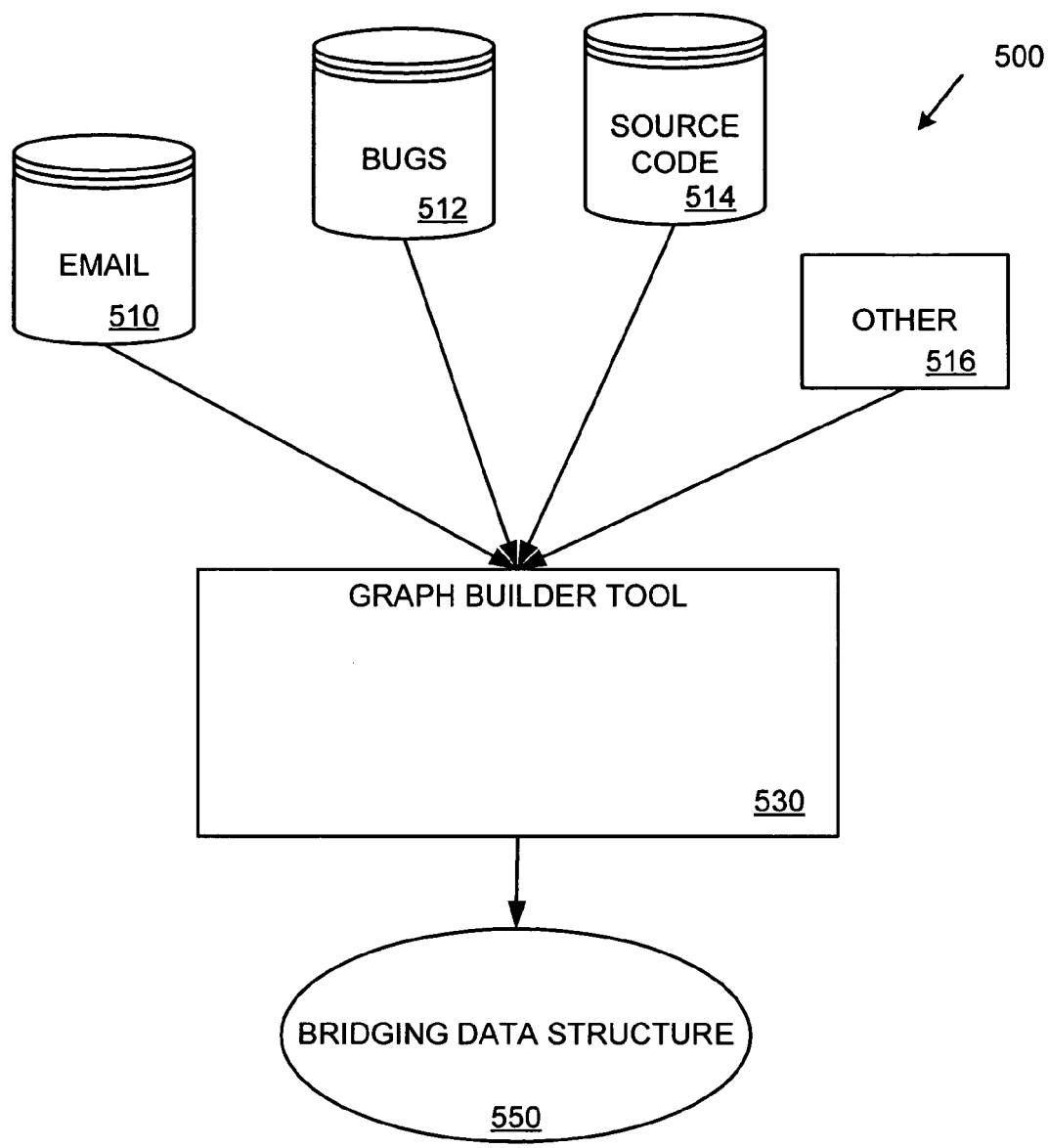
FIG. 5 is a block diagram of an exemplary system for creating a bridging data structure based on a plurality of disconnected data collections.

FIG. 5 is a block diagram of an exemplary system 500 for creating a bridging data structure based on a plurality of disconnected data collections. The bridging data structure can take the form of any of the graph data structures described herein.

In the example, a graph builder tool 530 creates a bridging data structure 550 based on the disconnected data collections 510, 512, 514, and 516. The bridging data structure can indicate relationships detected between the various software development items that are involved in the software development project related to or discussed in the disconnected data collections.

As shown in the example, the disconnected data collections can include an email database 510 (e.g., used by an email server to store the contents of emails and related information), a bug management database 512, a source code management database (e.g., 514), other data collections 516 (e.g., documents), or some combination thereof.

Example 11

Exemplary System Bridging Disconnected Data Collections Via Recognizer(s)

Figure 6:
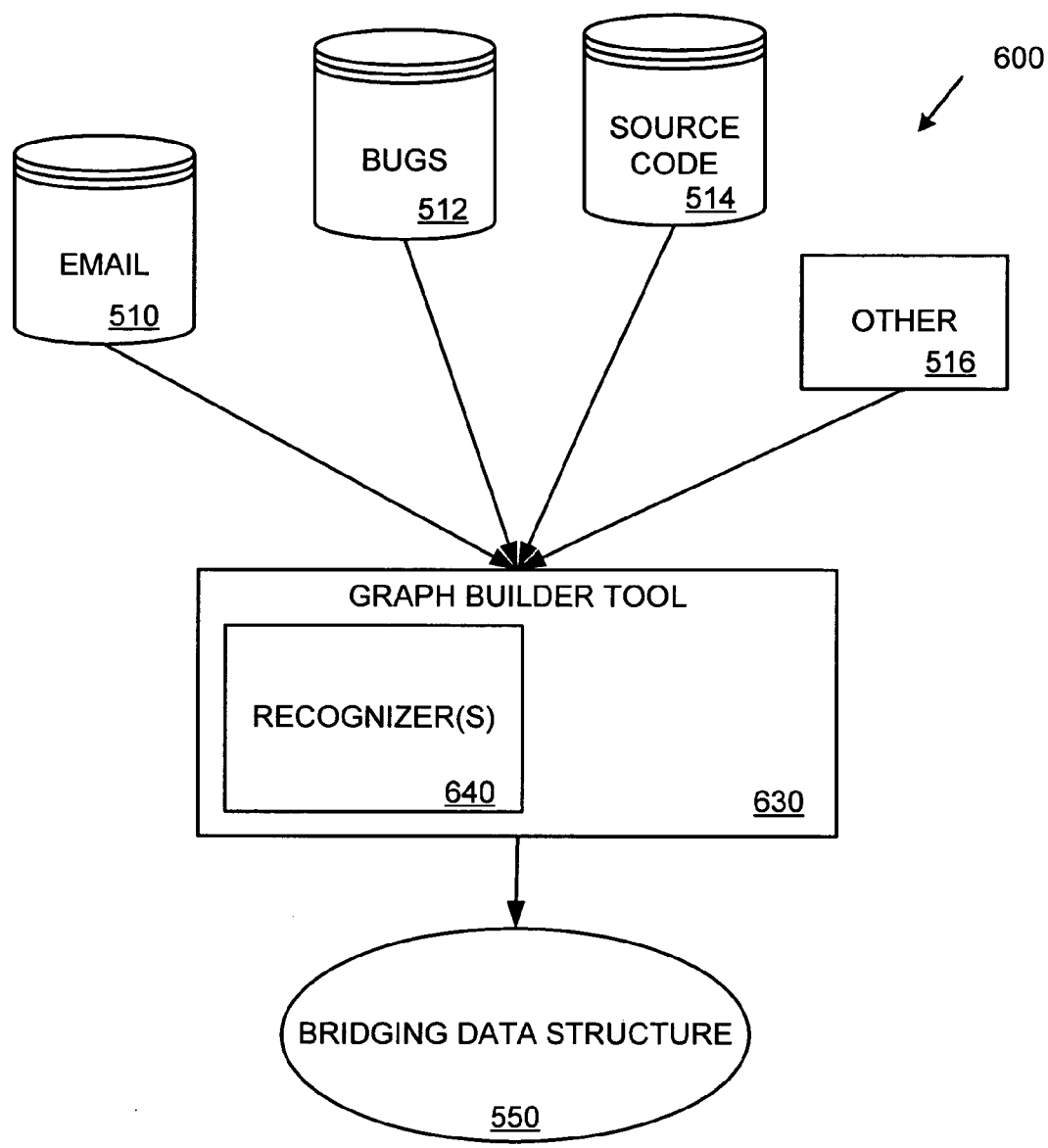
FIG. 6 is a block diagram of an exemplary system for creating a bridging data structure based on a plurality of disconnected data collections via one or more recognizers.

FIG. 6 is a block diagram of an exemplary system 600 for creating a bridging data structure based on a plurality of disconnected data collections via one or more recognizers 640. The system can be similar to that shown in FIG. 5, except that the graph builder tool 630 can include one or more recognizers 640.

The recognizers 640 can examine the content of text within the disconnected data collections to detect relationships between software development items (e.g., if a mention of a software development item is recognized as appearing in plain text).

Example 12

Exemplary Graph Data Structure for Representing Software Development Items

Figure 7:
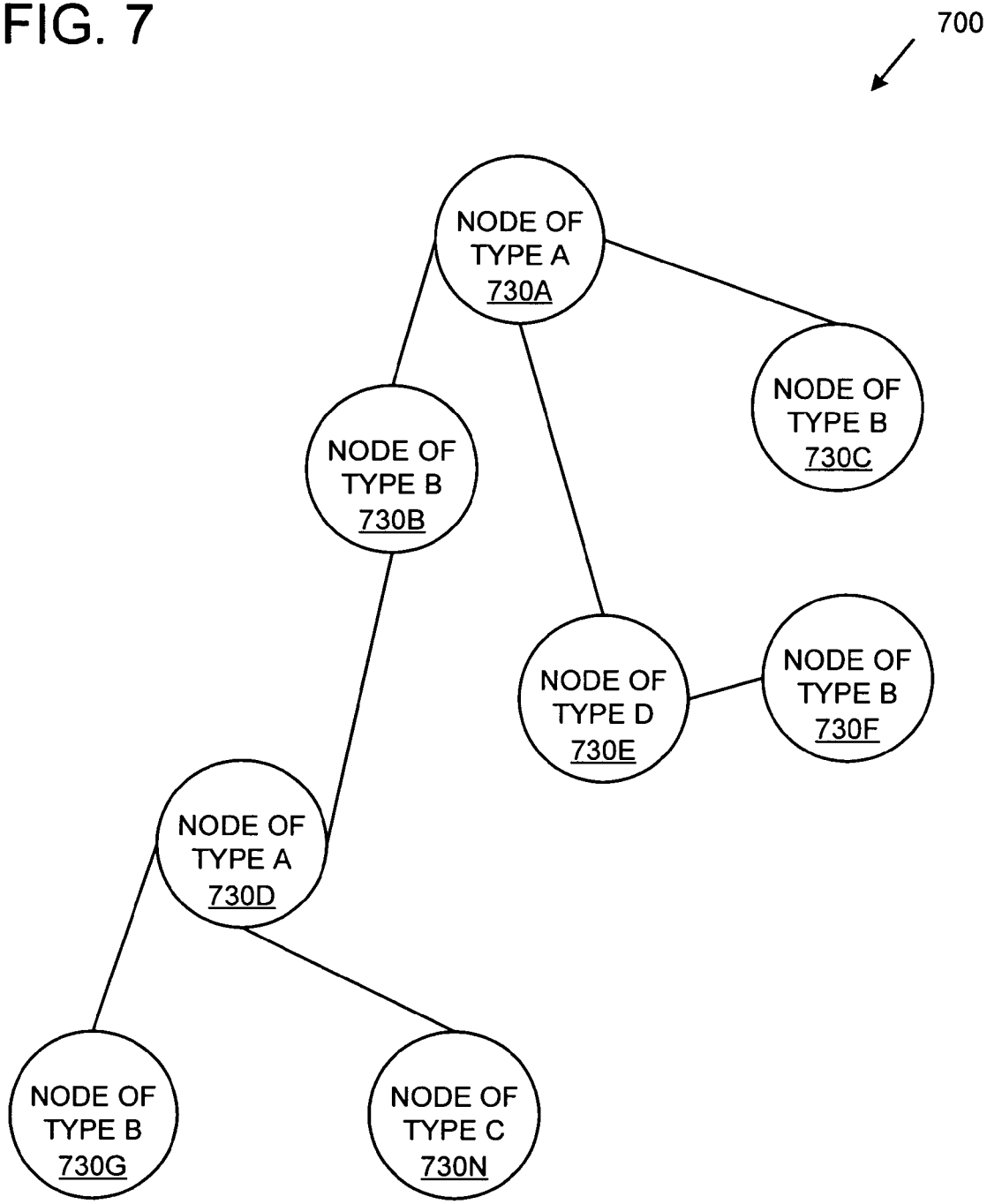
FIG. 7 is a diagram showing an exemplary graph data structure for representing software development items.

FIG. 7 shows an exemplary graph data structure 700 that can be used in any of the examples herein for representing software development items. In the example, nodes of different types represent different respective types of software development items. For example, a node of type A (e.g., 730A, 730D) can represent an email. A node of type B (e.g., 730B, 730C, 730F, 730G) can represent a developer (e.g., who sent or received an email). A node of type D can represent a bug. For example, the different types of nodes can be represented by different object classes, resulting in a heterogeneous collection of typed nodes.

Example 13

Figure 8:
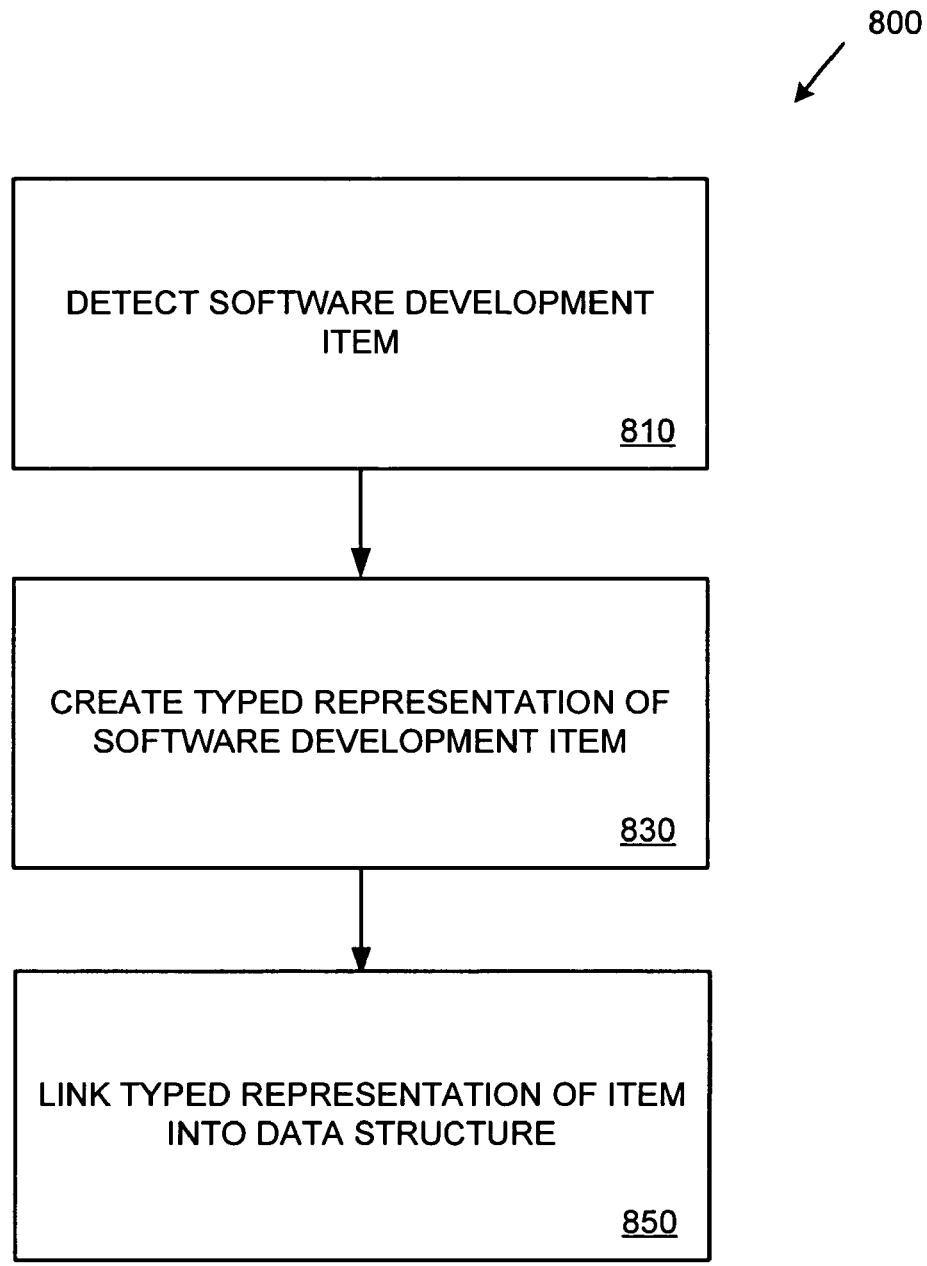
FIG. 8 is a flowchart showing an exemplary method of creating a typed data structure for representing software development items, such as that shown in FIG. 7.

Exemplary Method of Creating Graph Data Structure for Representing Software Development Items FIG. 8 is a flowchart showing an exemplary method of creating a typed data structure for representing software development items, such as that shown in FIG. 7. In the example, at 810 a software development item is detected. At 830, responsive to detection of the software development item, a typed representation of the software develop item is created. For example, as described in Example 12, different types of nodes can represent respective different types of software development items.

At 850, the typed representation is linked into the data structure. For example, an edge can link a node into a graph data structure.

Example 14

Exemplary Weighted Edges

In any of the examples described herein, edges in the graph data structure can be weighted to indicate a value (e.g., cost or strength) for the edge. If desired, the edge can have two values, indicating a value when traversing the edge in one or the other direction. Such a value can indicate a perceived (e.g., semantic) strength relationship between the items. For example, if an item is mentioned several times in an email, the relationship may be stronger. So, the edge connecting the item and the email can be weighted accordingly as compared to an item that is mentioned only once in the same email.

Another use for edge weightings is to indicate a confidence score. In the case of a recognizer, confidence of the relationship can be indicated or otherwise factored into edge weight.

Example 15

Figure 9:
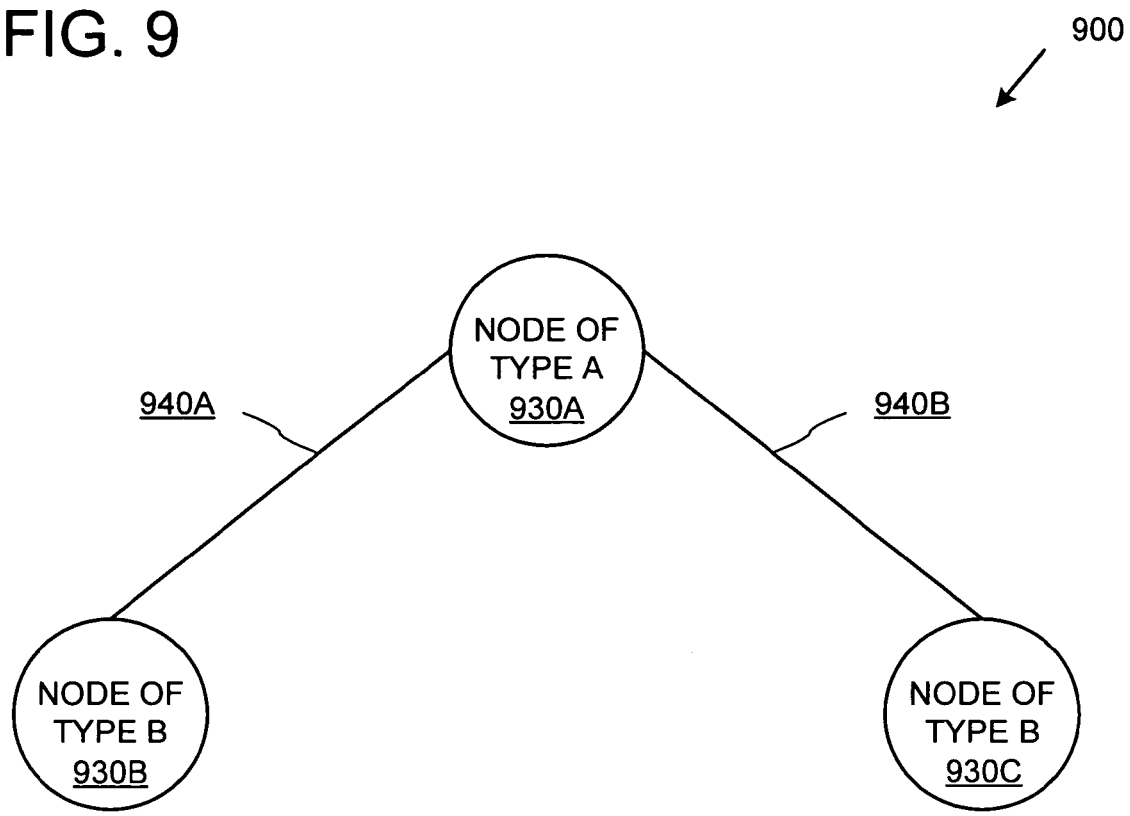
FIG. 9 is a diagram of an exemplary graph data structure comprising typed edges to indicate a relationship type between represented software development items.

Exemplary Graph Data Structure for Representing Relationships Between Software Development Items Via Typed Edges FIG. 9 shows an exemplary graph data structure 900 comprising typed edges to indicate a relationship between represented software development items. Such an arrangement can be used to indicate relationships in any of the examples herein.

In the example, a node 930A is connected to another node 930B via an edge 940A and the node 930A is connected to another node 930C via an edge 940B. The edges 940A and 940B can be of different types to indicate different relationships. For example, one type of edge 940A can indicate a sent/sent-by relationship and another type of edge 940B can indicate a received/received-by relationship. For example, the different types of edges can be represented by different object classes.

Example 16

Figure 10:
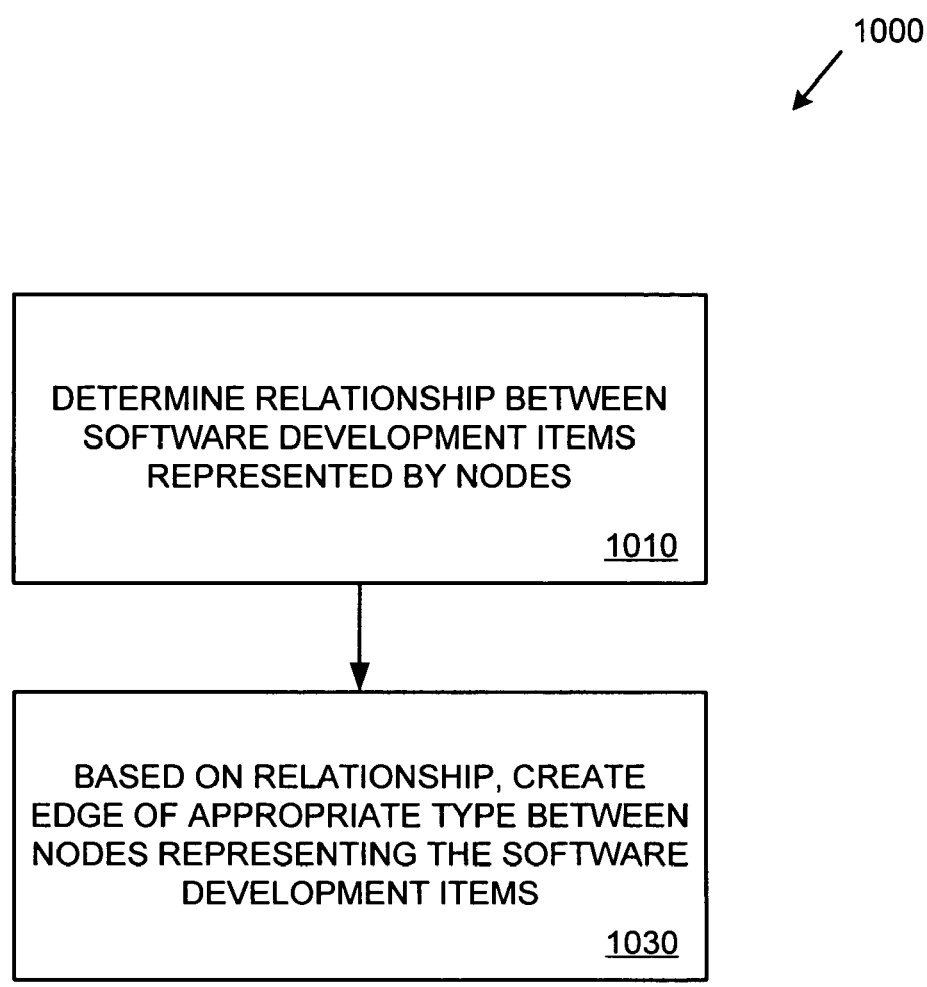
FIG. 10 is a flowchart showing an exemplary method of creating a graph data structure comprising typed edges to indicate a relationship between nodes, such as that shown in FIG. 9.

Exemplary Method for Representing Relationships Between Software Development Items Via Typed Edges FIG. 10 is a flowchart showing an exemplary method 1000 of creating a graph data structure comprising typed edges to indicate a relationship between nodes, such as that shown in FIG. 9. The method 1000 may be used in any of the examples herein to represent relationships between nodes in a graph data structure representing any of the software development items described herein.

In the example, at 1010 a relationship between software development items represented by nodes is determined. At 1030, based on the relationship detected, an edge of appropriate type is created between nodes representing the software development items.

The edge creation can be done in conjunction with node creation or separately.

Example 17

Exemplary Class Hierarchy for Nodes

Figure 11A:
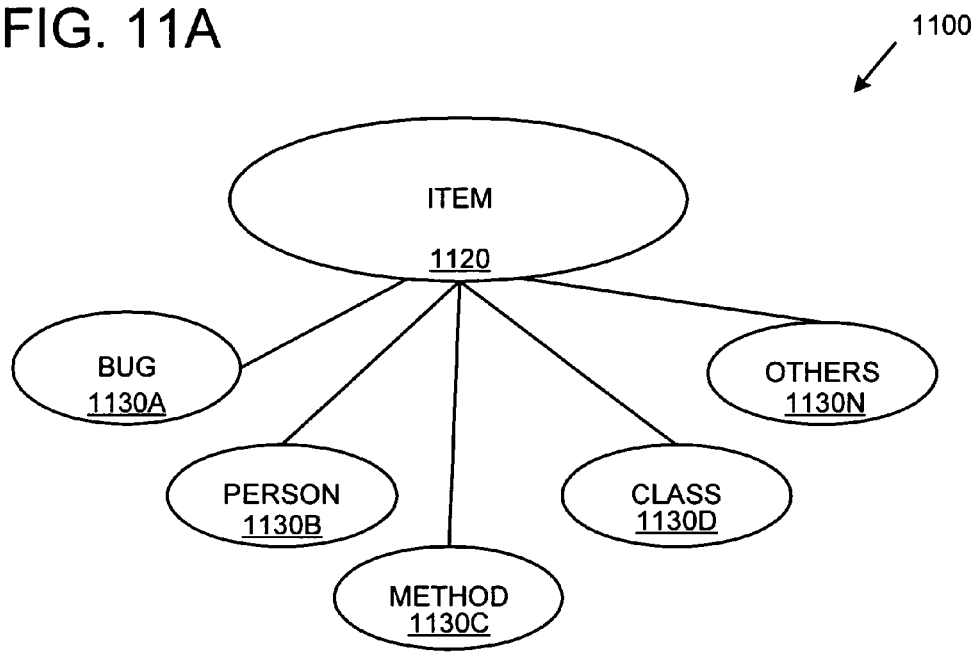
FIG. 11A is a diagram showing an exemplary class hierarchy for use when representing software development items in a graph data structure.

FIG. 11A shows an exemplary class hierarchy for use when representing software development items in a graph data structure. In the example, a different object class for a node can be used when representing different software development items. Such an approach can be used when representing any of the software development items described herein.

In the example, the object classes bug 1130A, person (e.g., developer) 1130B, method 1130C, class 1130D, and others 1130N are child classes (e.g., inherit from) a same parent class item 1120. In this way, functionality and properties can be extended as appropriate for the particular software development item being represented. For example, the bug class 1130A can include properties indicating a bug identifier and the status of the bug. When a node representing a bug is created in the graph data structure, a node of type bug 1130A can be instantiated, filled with the appropriate data, and linked into the graph data structure.

Example 18

Exemplary Class Hierarchy for Edges

Figure 11B:
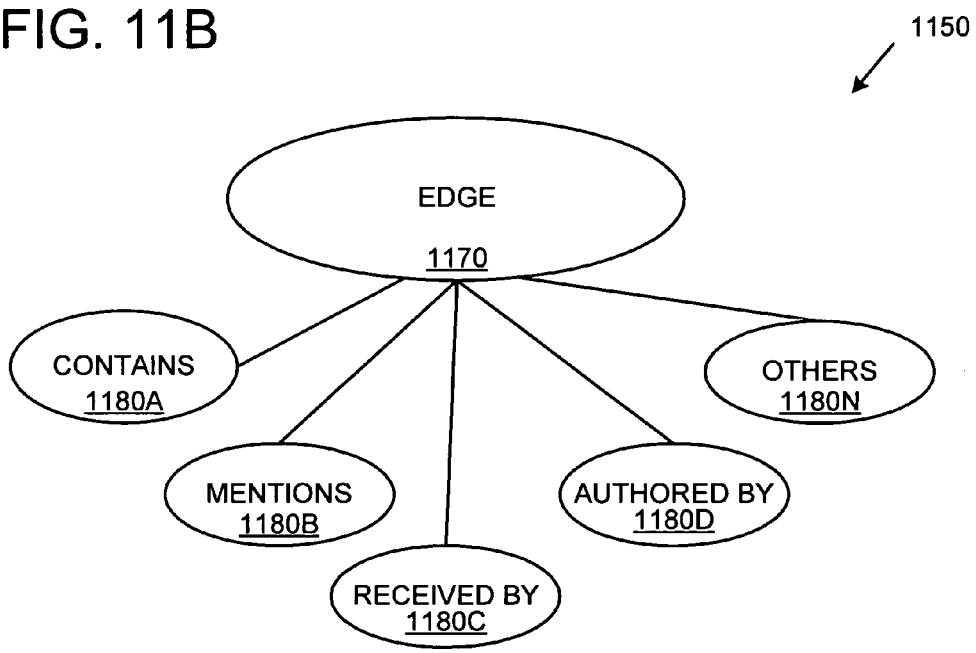
FIG. 11B is a diagram showing an exemplary class hierarchy for use when representing edges in a graph data structure such as those created with nodes having classes as shown in FIG. 11A.

FIG. 11B shows an exemplary class hierarchy for use when representing edges in a graph data structure representing software development items. In the example, a different object class for an edge can be used when representing different relationships between software development items. Such an approach can be used when representing any of the relationships between software development items described herein.

In the example, the object classes contains 1180A, mentions 1180B, received-by 1190C, authored-by 1180D, and others 1180N are child classes (e.g., inherit from) a same parent class edge 1170. In this way, functionality and properties can be extended as appropriate for the particular relationship being represented. For example, the received-by class 1180C can include properties indicating what was received and which developer received it. Also, any of the edges can be associated with a cost, which can be determined at least in part by the object class. When an edge representing the received-by relationship is created in the graph data structure, a node of type received-by 1180C can be instantiated, filled with the appropriate data, and placed into the graph data structure.

Example 19

Exemplary Query Tool

Figure 12:
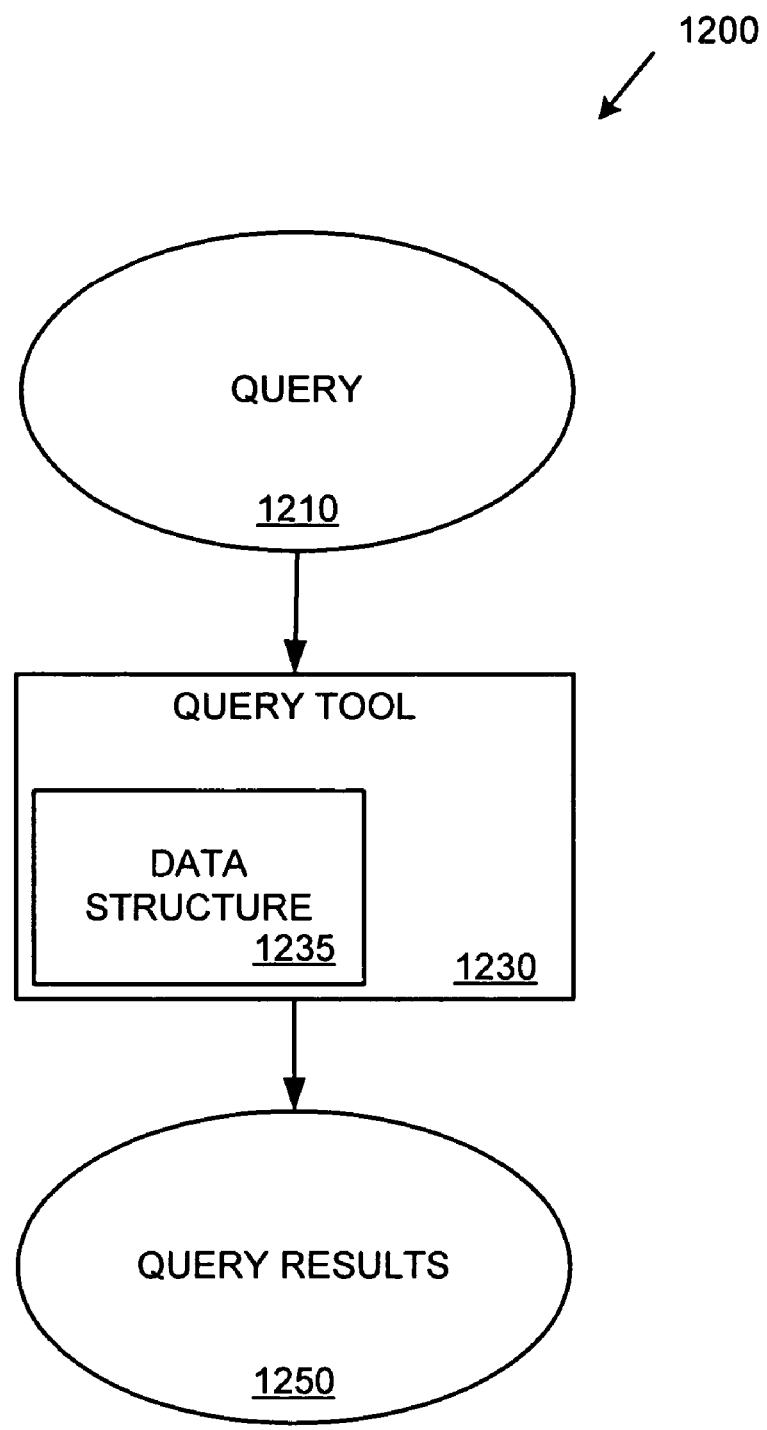
FIG. 12 is a block diagram of an exemplary query tool for inspecting a data structure and providing query results based on a query.

FIG. 12 shows an exemplary query tool 1230 for inspecting a graph data structure and providing query results 1250 based on a query 1210. Such a tool 1230 can be used to query any of the graph data structures described herein.

In the example, the query tool 1230 has access to a graph data structure 1235 (e.g., any of the graph data structures described herein).

Example 20

Exemplary Method for Providing Results

Figure 13A:
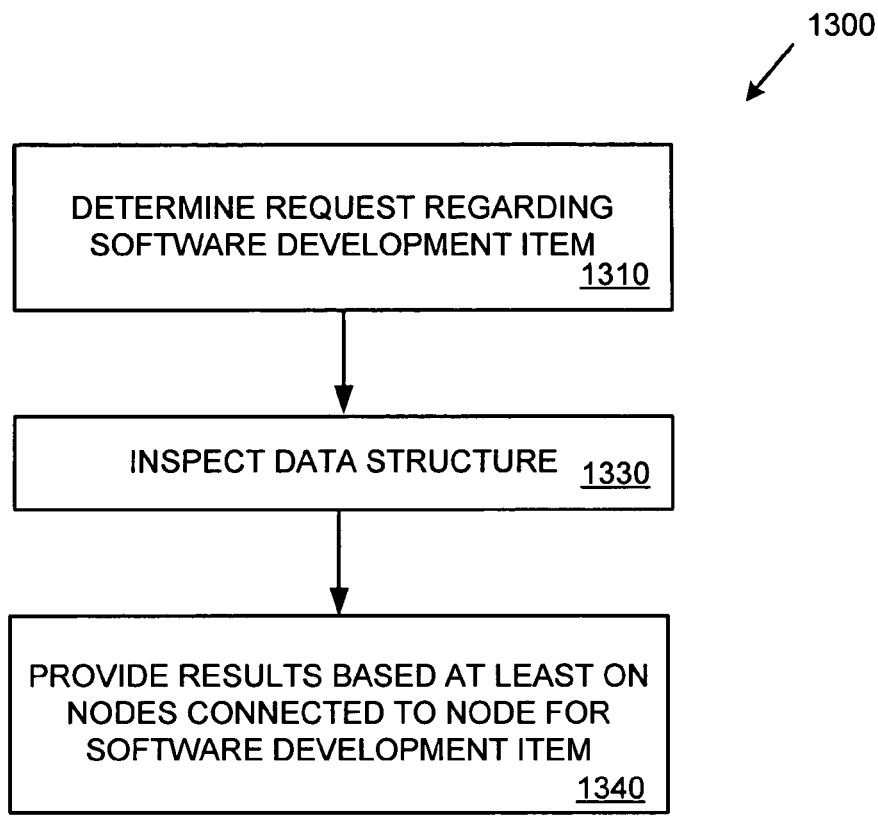
FIG. 13A is a flowchart showing an exemplary method of processing a request to show software development items related to a specified software development item and can be used in a system such as that shown in FIG. 12.

FIG. 13A is a flowchart showing an exemplary method 1300 of processing a request to show software development items related to a specified software development item and can be used in a system such as that shown in FIG. 12.

In the example, at 1310, the request (e.g., query) regarding a specified software development item is determined. At 1330, the graph data structure is inspected based on the request. At 1340, results are provided based at least on nodes connected to the node representing the specified software development item. For example, the closest nodes (e.g., nodes proximate to the node representing the specified software development item) can be provided. Results can be presented in a user interface if desired. Other factors can be included when presenting results.

Example 21

Exemplary Method for Implementing a Query to Determine Results

Figure 13B:
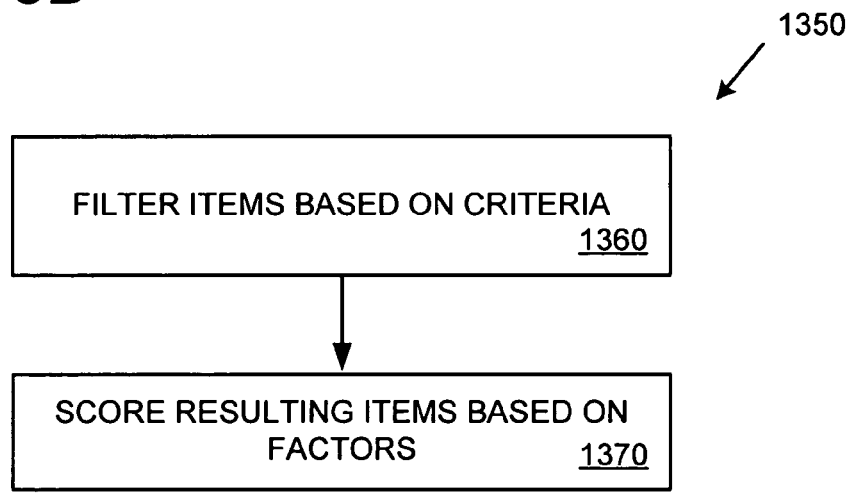
FIG. 13B is a flowchart showing an exemplary method of implementing a query with both filtering and scoring and can be used in conjunction with the method shown in FIG. 13A.

In any of the examples herein, a query of the graph data structure can be used to determine results. Such a query can comprise filtering and scoring. FIG. 13B shows an exemplary method 1350 for implementing a query on a graph data structure.

At 1360, software development items in the graph data structure are filtered based on specified criteria. Filtering can involve selecting a subset of the items that match a set of criteria. For example, a query may specify that only items that contain the word "banana" should be returned in the result set, or only items of type bug, or only items of type bug that contain "banana" or only items that are of type bug or contain "banana."

At 1370, the resulting items from the filtering are scored based on factors. Scoring can compute an estimate of the importance of items in the result set. For example, the score may be composed of one or more factors that are combined (e.g., multiplied or added together) into an overall score value.

Factors can include any one or more of those shown in Table 1. For example, connectivity score can be combined with any one or more of the others.

TABLE 1

Scoring Factors

| Factor | Description |
|---|---|
| Static score | An estimate of relevance of an item based on measurable human behavior on the item such as linking, editing, viewing, and the like |
| Query-dependent score | An estimate of the extent to which the item matches the filter (e.g., the number of times an item mentions "banana") |
| Time-dependent score | An estimate of the relevance of an item based on its age. Generally, an item becomes less relevant as it ages. |
| Type-dependent score | Some types of items can be considered more relevant that others (e.g., a developer will typically be much more interested in bugs and people than test cases and test results) |
| Connectivity score | An assessment of the degree to which the item in the result set is connected through the graph to one or more anchor items |
| Other score | Other factors can be included or added in the future |

The anchor items can vary as desired. For example, the anchor items can be specified as part of the query. When using implicit query, the one or more focus items can be the anchor items (e.g., if the user is focusing on a bug, then the anchor item set is the bug; if the user is focusing on a method, then the anchor item set contains the method, its class, and the file that contains the class). In a search interface, a user may add or remove items to the anchor set (e.g., via right-click commands or drag-and drop.)

If desired, the connectivity score factor can be adjusted based on the number of edges incident to a particular intervening node. So, consider a scenario anchored on node A and calculating the connectivity score factor for node C in the results. If there are edges connecting A to B and B to C, there is connectivity between A and C. However, if there are few incident edges for intervening node B, then the strength of the connection between A and C can be made higher than if B has many incident edges.

Having performed filtering and scoring, the resulting items can be provided as results.

Example 22

Exemplary Queries

In any of the examples described herein, a query can take a variety of forms. For example, a query can take the form of a request for software development items "related to" a particular software development item. Further, the request can specify that results are to be limited to a particular type (e.g., "show me all items of type x related to item y."). In this way, for example, a query could ask, "which developers are related to bug number 1325?" Or, a query could ask, "which discussions (e.g., emails) are related to method Account.Add?" Scoring can be applied to the results.

Queries can be received in a variety of ways via various user interfaces, such as via drop down menus, query-by-example, and the like. Also, as described herein, implicit query can be supported.

Example 23

Exemplary Other Techniques for Determining Results

In any of the examples described herein, results of a query can be determined in a variety of other ways, alone, or in combination with the other techniques already described. For example, when a request for items "related to" a specified software item is received, results can indicate the software development items having nodes connected to the node for the specified software item in the graph data structure. Alternatively, results can indicate those items within n nodes of the specified item, where the value for n can be configured as desired. Nodes within one node are adjacent to each other. Still alternatively, results can indicate any of those items connected to the specified item, regardless of path length. Other techniques can be employed.

Alternatively, items can be ranked according to their distance from the specified software item in the graph. Further, if desired, the distance can be calculated via weighted edges in the graph. In this way, items having stronger relationships can be presented more prominently, ranked higher, or both.

Example 24

Exemplary Recognition of Software Development Item Mentions in Plain Text

In any of the examples herein, any of the sources of plain text described herein can be processed to recognize mentions of software development items.

Mentions of the following items can be recognized in plain text: bugs, object classes, object method names, filepaths (e.g., according to the universal naming convention), file names, email addresses (e.g., including aliases), interfaces (e.g., collections of semantically-related functions), structures, enumerated types, enumerated type constants, and Uniform Resource Locators.

Figures 14A, 14B:
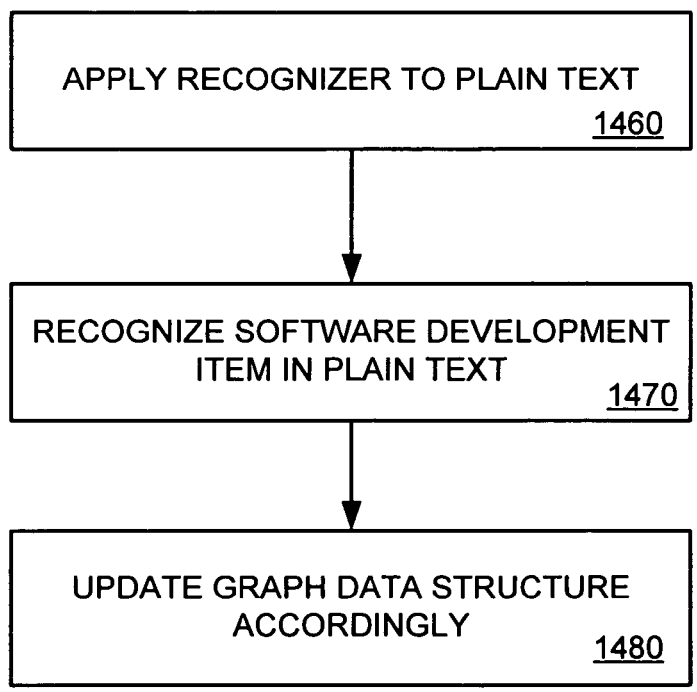
FIG. 14A is a block diagram showing an exemplary snippet of plain text including a detected mention of a software development item.
FIG. 14B is a flowchart showing an exemplary method of recognizing a software development item mention within plain text, such as that shown in FIG. 14A.

FIG. 14A shows an exemplary snippet 1410 of plain text including a detected mention of a software development item. A variety of techniques can be used to find such mentions, including recognition or deduction based on the form of the mention or text pattern preceding or following the mention.

Example 25

Exemplary Method for Recognizing Software Development Item Mentions in Plain Text FIG. 14B shows an exemplary method of recognizing a software development item mention within plain text, such as that shown in FIG. 14A, which can be used in any of the examples herein when modifying a graph data structure.

At 1460, a recognizer is applied to the plain text. For example, a parser or other software can scan through the plain text to apply a set of rules or other logic to recognize mentions of software development items.

At 1470, a mention of a software development item is recognized in the plain text. For example, a portion of the plain text may satisfy a particular rule, which indicates that neighboring text is a mention of a software development item.

At 1480, responsive to having recognized the mention, the graph data structure is updated accordingly. For example, a node representing the item mentioned can be added if appropriate. Also, a relationship can be created or strengthened based on having recognized the mention.

Example 26

Exemplary Techniques for Recognizing Software Development Items

Although some of the examples herein are directed to recognizing software development item mentions, it is also possible to recognize the software development items themselves. So, for example, when scanning source code in a data collection (e.g., a source code store), it is possible to recognize the definition of an object class. Accordingly, an appropriate relationship can be created (e.g., "contained in" to relate a method to a class or "defined in" to relate a definition to a source code file) responsive to such recognition.

Example 27

Exemplary Information Stored for a Node

In any of the examples herein, a node in the graph data structure can also be associated with an indication of time (e.g., a starting date or an ending date). Such time indications can be used when making a request to limit results to those within a date range. When displayed, the date can be shown, the number of days relative to today can be shown (e.g., "3 days ago"), or both.

Example 28

Exemplary Software Development Item: Email

In any of the examples herein, an email can be processed to detect software development items and the relationships between them. For example, a graph builder tool can process (e.g., crawl) emails in an email database and add a node to the graph data structure to represent the email. Links can then be made from the node representing the email to items related to the email, such as who sent the email and what was mentioned in the email.

TABLE 2

Exemplary Software Items in Email

| Item Detected | Software Development Item Action |
|---|---|
| Sender, recipient, cc recipient | Node ("sent," "received," etc.) for developer; edge from email to developer |
| Mention of software development item in plain text (e.g., subject or body) | Node ("mentioned in") for software development item; edge from email to item |
| Predecessor or successor message (e.g., forward, reply, reply all) | Edge ("has reply," etc.) from email to other message |

Example 29

Exemplary Software Development Item: Source Code Check-in

In any of the examples herein, a code check-in can be processed to detect software development items and the relationships between them. For example, a graph builder tool can process a source code management system and add a node to the graph data structure to represent the code check-in. Links can then be made from the node representing the code check-in to items related to the code check-in, such as who checked the code in and what was mentioned in the code check-in. Additionally, any changes to the code can be determined (e.g., via a compare), and such changes can themselves be treated as software development items, which can in turn be inspected for detection of or mentions of software development items.

TABLE 3

Exemplary Software Items in Code Check-in

| Item Detected | Software Development Item Action |
|---|---|
| Developer checking in | Node for developer; edge ("checked-in") from check-in to developer |
| Mention of software development item in plain text (e.g., check-in notes or description) | Node for software development item; edge ("mentioned in") from check-in to item |
| Source code change | Node for change; Process for detection or mention of software development items; create edges to change; also edge from change to changing developer (e.g., the developer who checked in the related code) |

Example 30

Exemplary Software Development Item: Bug

In any of the examples herein, a bug report can be processed to detect software development items and the relationships between them. For example, a graph builder tool can process a bug tracking system and add a node to the graph data structure to represent the bug. Links can then be made from the node representing the bug to items related to the bug, such as who opened the bug and what was mentioned in the bug report.

TABLE 4

Exemplary Software Items in Bug Report

| Item Detected | Software Development Item Action |
|---|---|
| Developer opening, closing, etc. | Node for developer; edge ("opened," "closed") from bug to developer |
| Mention of software development item in plain text (e.g., bug notes or description) | Node for software development item; edge ("mentioned in") from bug to item |

Example 31

Exemplary Software Development Item: Document

In any of the examples herein, a document (e.g., specification, design document, presentation, and the like) can be processed to detect software development items and the relationships between them. For example, a graph builder tool can process a document and add a node to the graph data structure to represent the document. Links can then be made from the node representing the document to items related to the document, such as who created the document and what was mentioned in the document.

TABLE 5

Exemplary Software Items in Document

| Item Detected | Software Development Item Action |
|---|---|
| Developer authoring, modifying, etc. | Node for developer; edge ("authored-by") from document to developer |
| Mention of software development item in plain text (e.g., document contents or properties) | Node for software development item; edge ("mentioned in") from document to item |

Example 32

Figures 15A, 15B:
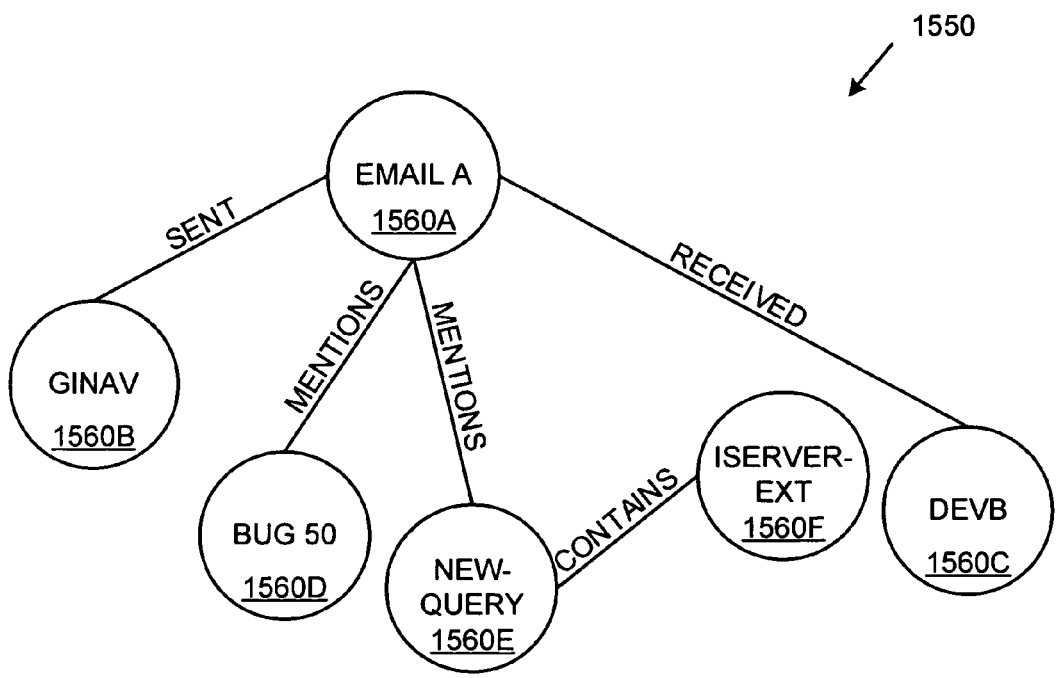
FIG. 15A shows an exemplary email containing software development item mentions.
FIG. 15B is an exemplary graph data structure representing relationships created between represented software development items based on the email shown in FIG. 15A.

Exemplary Processing of Item with Software Development Item Mentions in Plain Text FIG. 15A shows an exemplary email 1500 containing software development mentions. When such an email is processed by a graph builder tool to update the graph data structure, it can consider the software development items for the email 1500 and update the graph accordingly. For example, the graph builder tool can create a node for the email, determine which developers are involved, and recognize mentions of software development items in the plain text of the email.

FIG. 15B shows a graph data structure 1550 that has been constructed based on having processed the email 1500. As described herein, the nodes (1560A-1560F) can be of different types (e.g., an object class corresponding to the software development item). The nodes shown in the graph can be of types that are child object classes of the node object class. In the example, a node 1560A has been created to represent the email 1500. Appropriate nodes 1560B and 1560C can be created for the developers involved (e.g., ginav and devb).

Based on having detected a mention of bug 50 in the plain text of the email, a node 1560D can be created to represent bug 50. Alternatively, the node 1560D may have already existed in the graph data structure 1550 (e.g., based on having processed the bug database).

Based on having detected a mention of method IServerExtension.NewQuery in the plain text of the email, a node 1560E can be created to represent the method. Also, a node 1560F can be created for the related interface IServerExtension. Alternatively, these nodes 1560E and 1560F may have already been present in the graph data structure 1550 (e.g., based on having processed source code defining them).

Also, the edges connecting the various nodes can indicate the relationships between them. Thus the nodes 1560A and 1560B can be connected by an edge of type "sent" to indicate that the email was sent by the developer ginav. If desired, the edges can be associated with values. Object classes can be used to represent the edges, or some other technique can be used.

Example 33

Another Exemplary Plain Text with Software Development Item Mentions

Figures 16A, 16B:
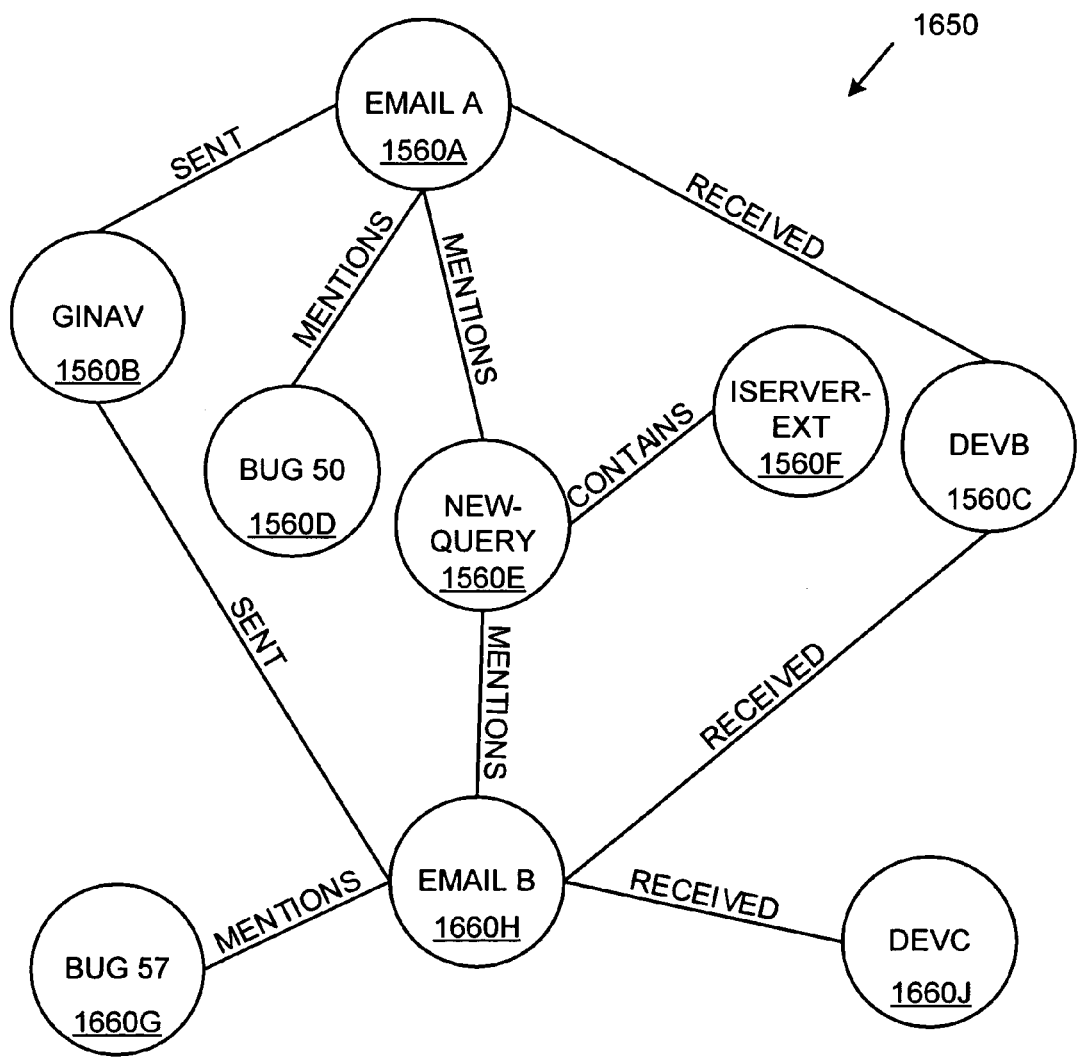
FIG. 16A is another exemplary email containing software development item mentions.
FIG. 16B is an exemplary version of the graph data structure shown in FIG. 15B, updated to represent relationships created between represented software development items based on the email shown in FIG. 16A.

FIG. 16A is another exemplary email 1600 containing software development item mentions. When such an email is processed by a graph builder tool to update the graph data structure, it can consider the software development items for the email 1600 and update the graph accordingly. For purposes of illustration, an updated version of the graph 1550 is shown. The graph 1550 has been updated to reflect having processed the email 1600. As with the other email, the graph builder tool can create a node for the email, determine which developers are involved, and recognize mentions of software development items in the plain text of the email.

FIG. 16B is an exemplary version of the graph data structure shown in FIG. 15B. The data structure has been updated to represent relationships created between represented software development items based on the email shown in FIG. 16A.

In the example, a node 1560H has been created to represent the email 1600. Because appropriate nodes 1560B and 1560C already exist for two of the developers, they are merely connected to the node representing the email. A third developer node 1660J can be created for developer devc.

Based on having detected a mention of bug 57 in the plain text of the email, a node 1660G can be created to represent bug 57. Alternatively, the node 1660G may have already existed in the graph data structure 1650 (e.g., based on having processed the bug database).

Based on having detected a mention of method IServerExtension.NewQuery in the plain text of the email, the node 1560E can be connected to the node 1660H representing the email.

Again, the edges connecting the various nodes can indicate the relationships between them. Although not shown, additional edges can be includes (e.g., an edge of type "reply" connecting a node representing an email to a node representing a reply to the email).

Given the data structure 1650 shown in FIG. 16B, a request for "All bugs related to bug 50" can traverse the data structure 1650 from the node 1660D representing bug 50 through intermediate nodes and will reach the node 1660G, which is of type "bug" and indicates bug 57. Accordingly, the results can indicate that bug 57 is related to bug 50. In this way, having recognized discussion of two different bugs by the same sender in two different emails 1500 and 1600, the bugs have been linked in the data structure. The represented relationship is that the two bugs are mentioned in a set of emails involving the same sender. Although it is not certain what other relationships may exits, it is useful to know that the two bugs are so related. Such a relationship may also indicate other relationships (e.g., being related to a same issue, even if such an issue has not yet been uncovered by the development team).

Example 34

Exemplary Recognizer: Bug

FIG. 17A shows exemplary recognition of a bug mention in plain text 1710, which can be used with any of the examples described herein. In the example, a mention of bug 153 has been recognized based on the pattern "bug ###" (e.g., the word "bug" followed by a number). Other techniques can be used, and variations can also be used (e.g., "bug no. ###," "bug number ###," and the like).

Example 35

Exemplary Recognizer: Method

FIG. 17B shows exemplary recognition of a method mention in plain text 1760, which can be used with any of the examples described herein. In the example, a mention of the method Account.Add has been recognized based on the pattern "abc.def" (e.g., a word immediately followed by a period, immediately followed by another word). However, the recognition can be informed by consulting a list of known classes or interfaces, a list of known methods, or both. For example, the pattern can be "knownclass.knownmethod." Other techniques can be used, and variations can also be used (e.g., "knownmethod( )," and the like).

Example 36

Additional Sources for Relationships Between Nodes

Additional sources of information can be used to create relationships between nodes. For example, if it is determined that a code check-in occurred substantially at the same time as (e.g., within n minutes of, where n is a threshold) closing a bug by the same developer, a relationship between the code check in (e.g., and the related changed code) and the bug can be created. Such a relationship can be weighted based on how close in time the two events occurred (e.g., a strong relationship if within 5 minutes or less, and a weaker relationship if more than 3 hours).

Example 37

Exemplary Access by Client Applications

In any of the examples herein, functionality for building the graph data structure, or querying it can be accessed by client applications (e.g., via programming interfaces exposing functionality).

Example 38

Exemplary Implicit Query in a Software Development Context

Figure 18:
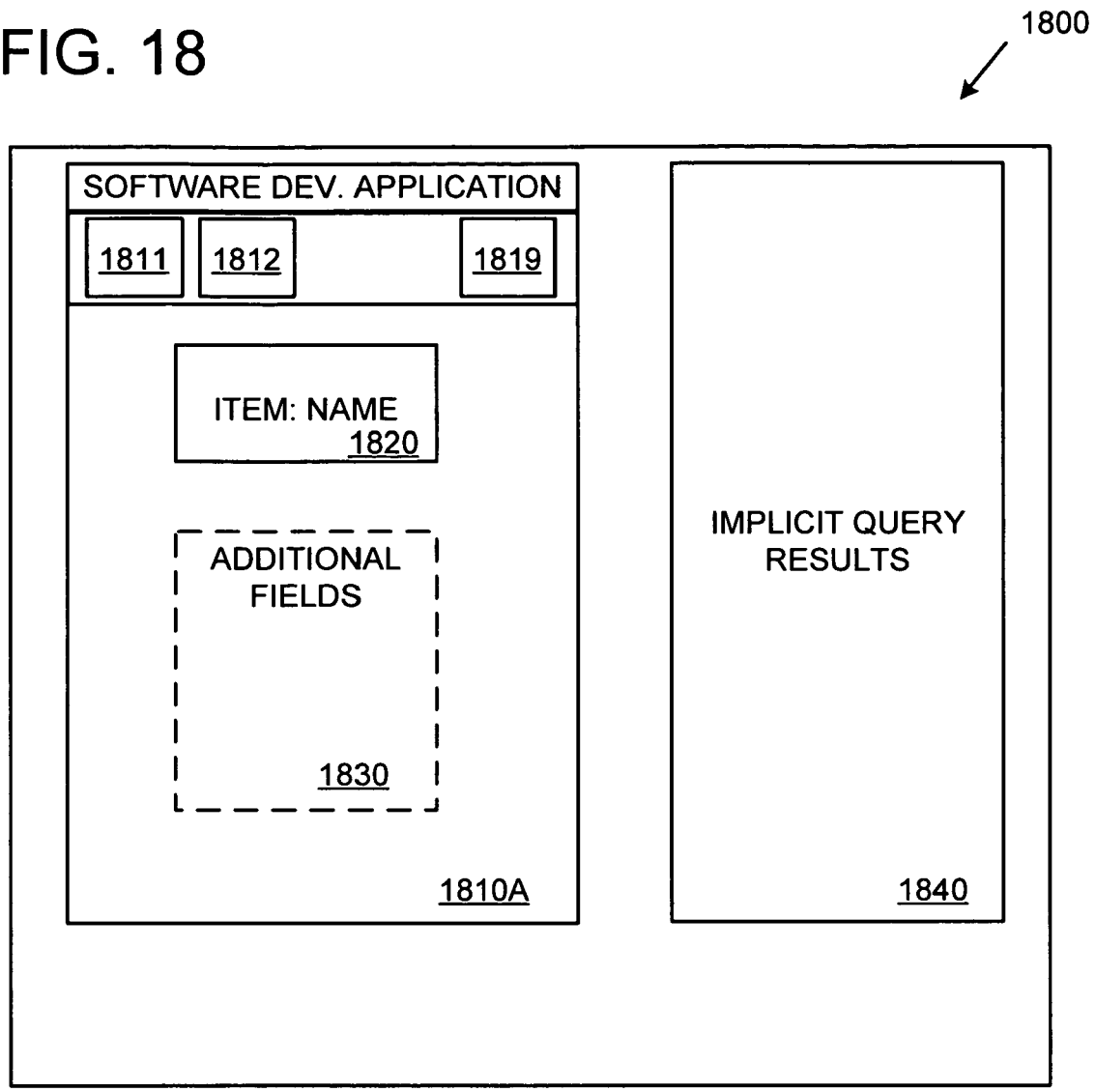
FIG. 18 is a screen shot showing an exemplary user interface implementing implicit query in a software development context.

FIG. 18 shows an exemplary user interface 1800 presenting implicit query results 1840 based on an implicit query detected in a software development application presenting a window 1810A. Such an implicit query can be determined by monitoring the user's interaction with the user interface controls and fields (e.g., controls 1811, 1812, and 1819 or fields 1820 and 1830 by an application outside of the software development application.

Figure 19:
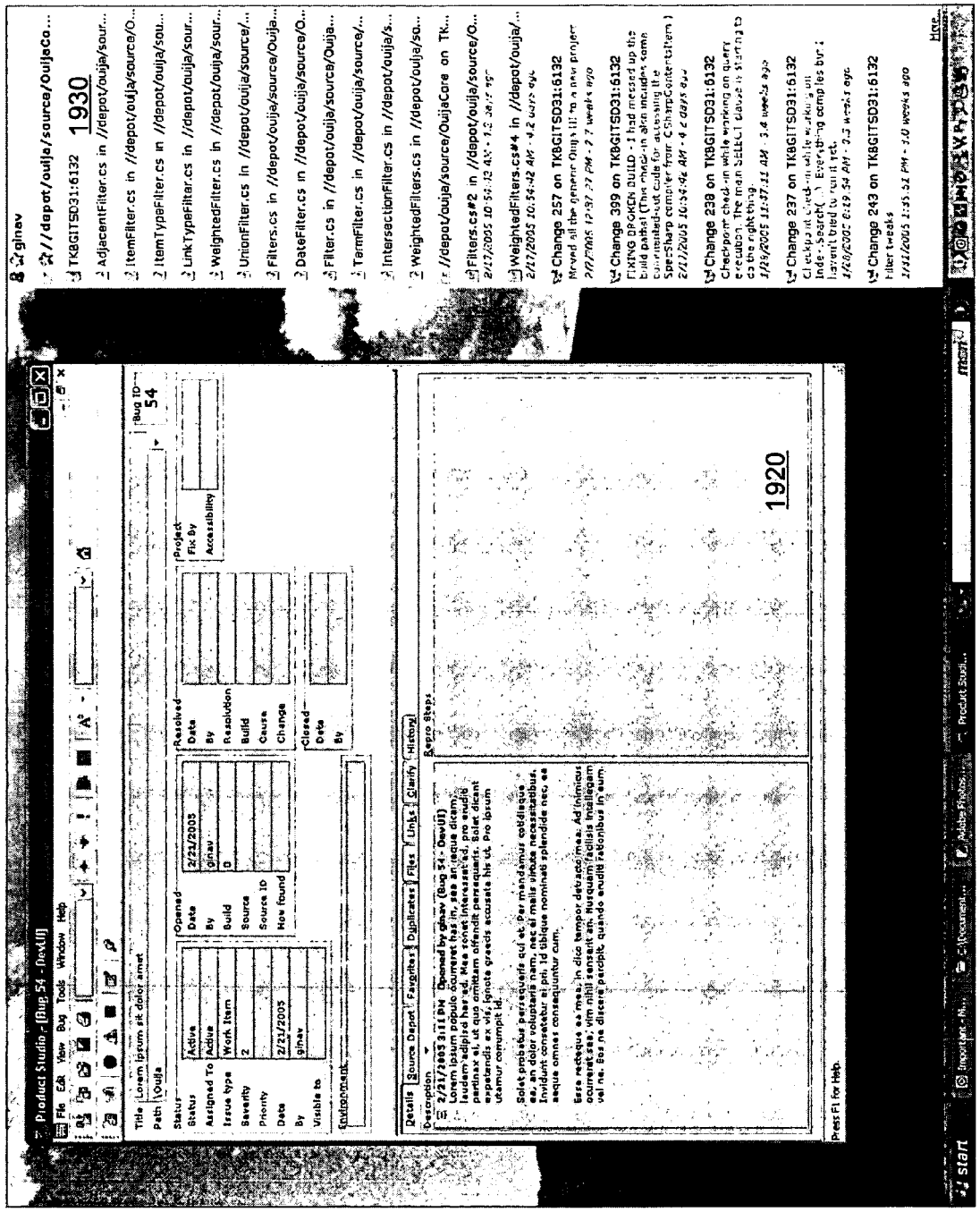
FIG. 19 is a screen shot showing another exemplary user interface implementing implicit query for software development items.

FIG. 19 shows another exemplary user interface 1900 presenting implicit query results 1930 based on an implicit query detected in a software development application presenting a window 1920. Similarly, the query can be determined by monitoring the user's interaction with the user interface controls and fields.

An implicit query technique can be used to perform a query in any software development scenario. For example, any of the queries or requests for software development items described herein can be so performed.

Example 39

Figure 20:
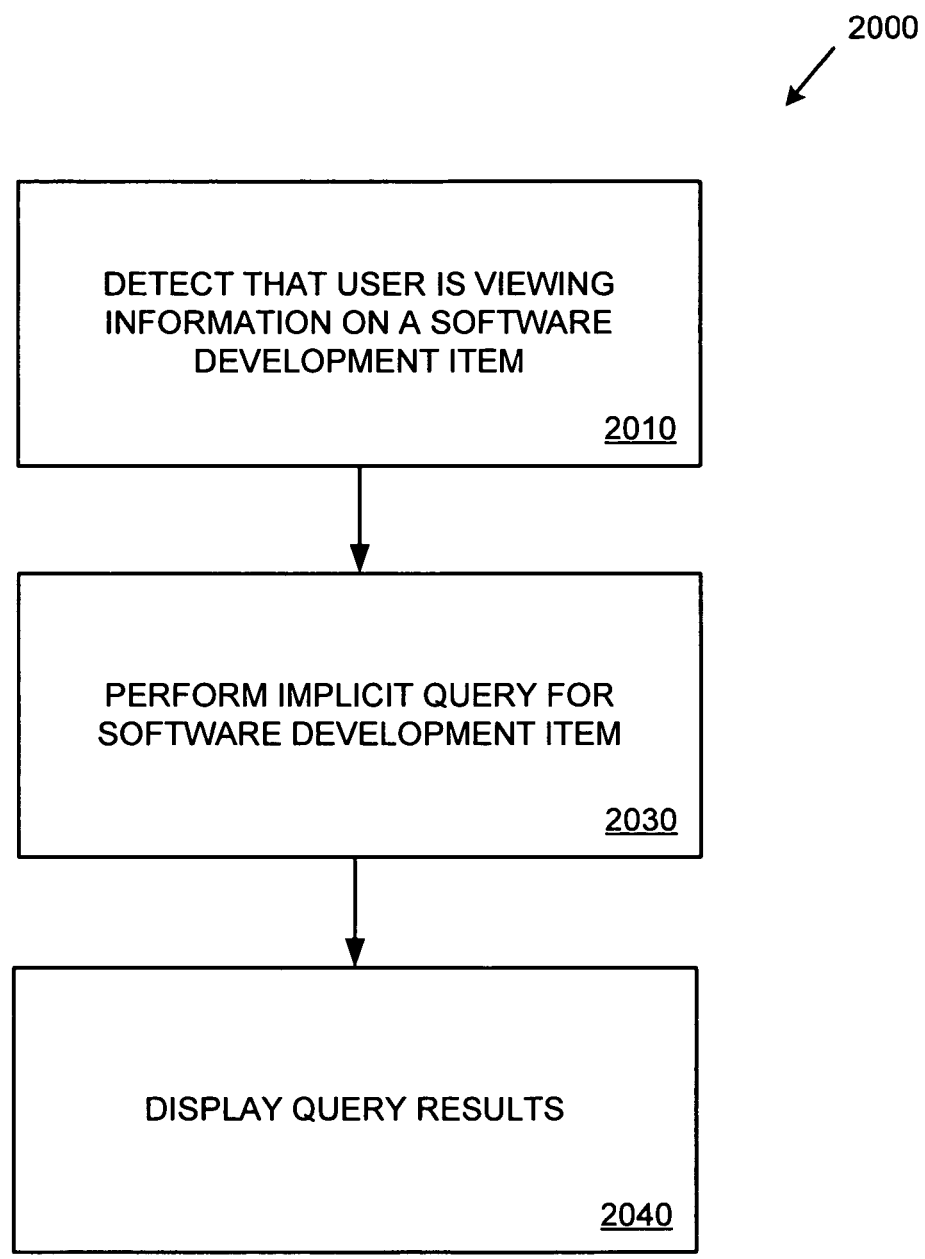
FIG. 20 is a flowchart showing an exemplary method for implementing implicit query for software development items and can be used to generate a user interface such as that shown in FIG. 18

Exemplary Method for Performing Implicit Query in a Software Development Context FIG. 20 shows an exemplary method 2000 for performing implicit query in a software development context, such as via the user interfaces shown in FIGS. 19 and 20. In the example, it is detected that a user is viewing information on a software development item 2010 (e.g. in a software development tool or application). For example, an application or other mechanism outside of the software development application can monitor the user's activity within a software development application (e.g., a bug tacking tool, source code management tool, and the like).

At 2030, an implicit query is performed for the software development item, responsive to the detecting. The query can be determined via the user's interaction with the user interface. The query can comprise a search for information on the software development item extrinsic to the software development tool or application. At 2040, the results are displayed. The results can be presented outside of the software development tool (e.g., in a sidebar). Alternatively, results can be presented in the tool (e.g., in a pane).

Such a technique can be used in combination with any of the examples described herein (e.g., the graph representing relationships between software development items). So, for example, the results can comprises at least one reference to a mention of a software development item (e.g., in a plain text item, such as an email).

Example 40

Exemplary Graph Browser

Figure 21A:
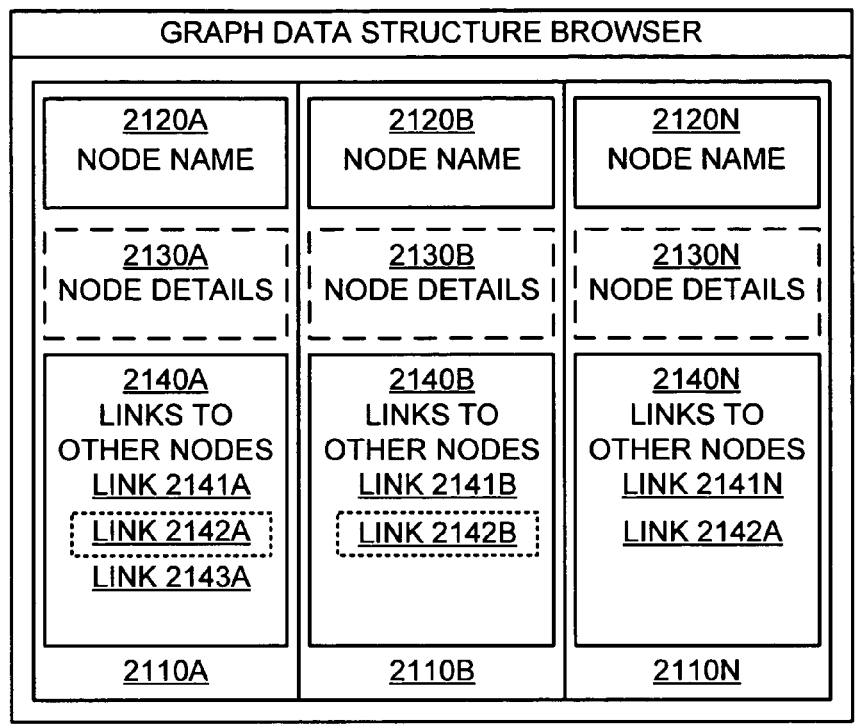
FIG. 21A is a screen shot showing an exemplary user interface implementing a graph data structure browser.

FIG. 21A shows an exemplary user interface 2100 implementing a graph data structure browser. Such a user interface 2100 can be used to browse any graph data structure, including the graph data structures described herein.

The browser interface 2100 can be constructed to display a plurality of panes. In the example, three panes 2110A, 2110B, and 2110N are shown. For each pane, a node name 2120A-N, links to other nodes 2140A-N, and node details 2130A-N can be shown. For the panes 2110A-2110N, the links to other nodes (e.g., 2140A) can show links adjacent to the subject link (e.g., node name 2120A) in the graph data structure. In practice, the links can show the linked-to node's name or some other identifier. The links can serve as respective activatable representations of the other nodes adjacent to the node in the graph data structure. An additional pane can appear or be filled upon having activated any of the links. Upon reaching an upper limit on the number of panes, the panes can be shifted (e.g., and the oldest pane dropped).

By activating any of the links in the links to other nodes 2140A (e.g., the link 2142A), the user can navigate within the graph. Such an activation displays the linked-to node in an adjacent pane (e.g., the pane 2110B). Links to other nodes are then shown in the adjacent pane (e.g., links 2141B and 2142B), by which the user can similarly navigate within the graph to display the linked-to node in an adjacent pane (e.g., the pane 2120N), which also displays links to other nodes (e.g., links 2141N and 2142A).

Figure 21B:
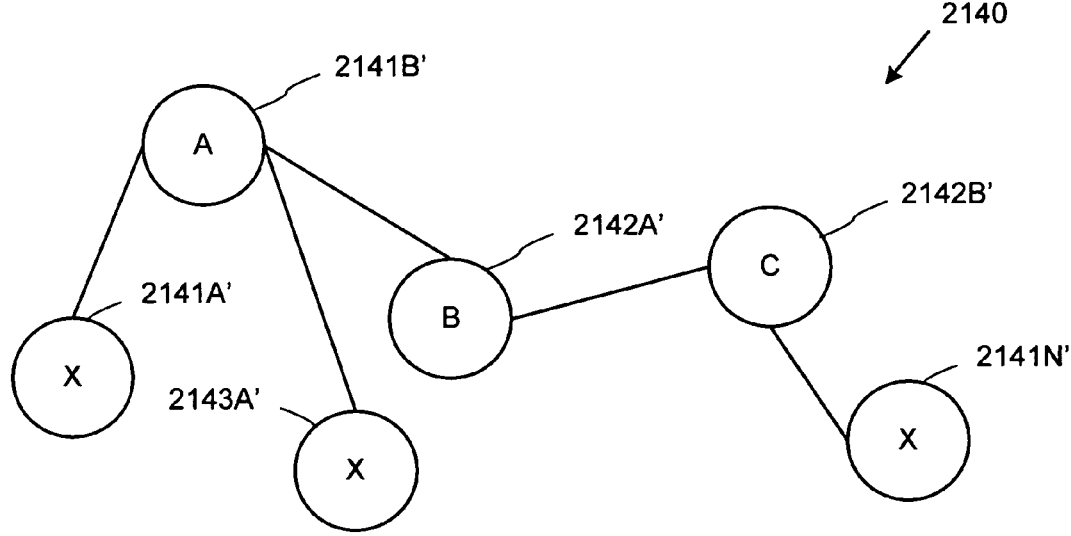
FIG. 21B is a diagram showing a graph data structure which is being browsed as shown in the user interface of FIG. 21A.

For purposes of illustration, FIG. 21B shows a graph 2140 having nodes 2141A', 2142A', 2143A' 2141B', 2142B', and 2141N', which correspond to the displayed panes and links shown in FIG. 21A (Node A corresponds to pane 2110A, Node B corresponds to pane 2110B, etc. and node A 2141B' can be navigated to via link 2141B, etc.). The graph 2140 can also be used with reference to FIGS. 22, 23, 25, 26A, and 26B in the same way, except that Node B corresponds to pane 2210B, and so forth.

The graph browser can navigate graph data structures more complex than a tree. If desired, the links to other nodes (e.g., 2140B) can present a link (e.g., 2141B) to at least the node (e.g., Node A) from which the user navigated the current node. If desired, the links to other nodes (e.g., 2140A) can present links for all nodes adjacent to the node presented.

In this way, the graph browser can support limitless browsing (e.g., no dead end to the graph is reached via the user interface) so that additional adjacent panes can always be presented in any graph having a plurality of connected nodes.

Example 41

Exemplary User Interfaces Presented by a Graph Browser

Figure 22:
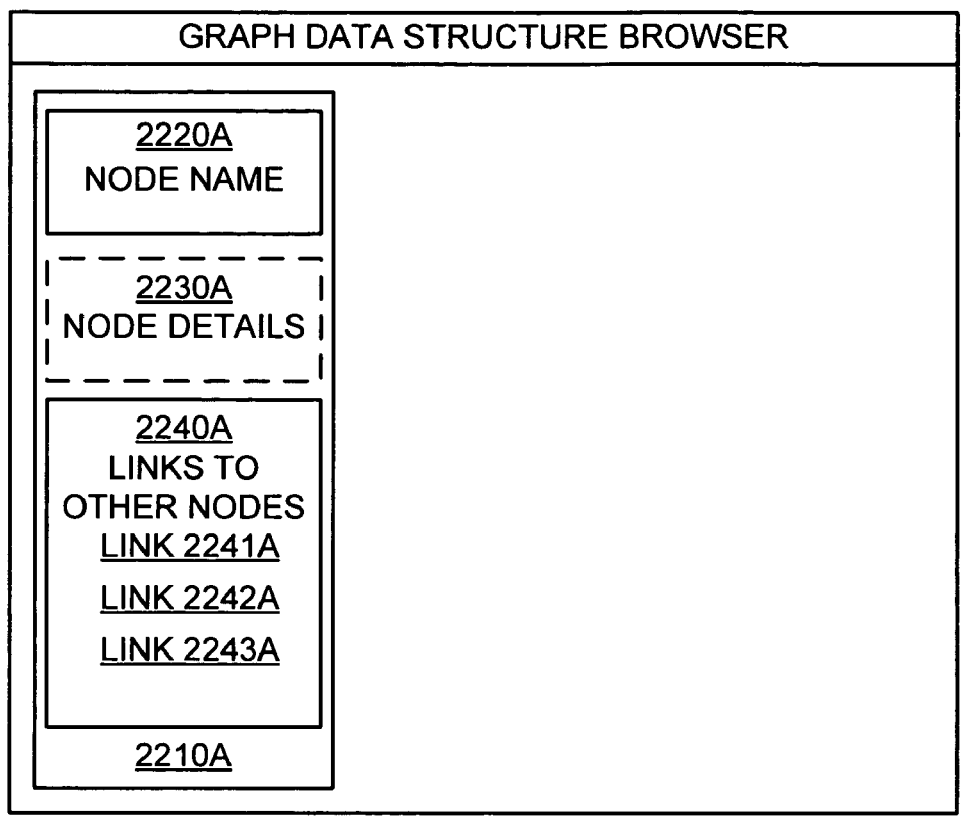
FIG. 22 is a screen shot showing an exemplary user interface implementing a graph data structure browser showing one pane.

FIG. 22 shows an exemplary user interface 2200 implementing a graph data structure browser showing one pane. Such a user interface can be used in conjunction with the graph browser described in Example 40.

In the example, a single page 2210A is shown, along with a node name 2220A, node details 2230A, and links to other nodes 2240A. By activating any of the links 2241A, 2242A, or 2243, the user can navigate to an adjacent node corresponding to the link.

Figure 23:
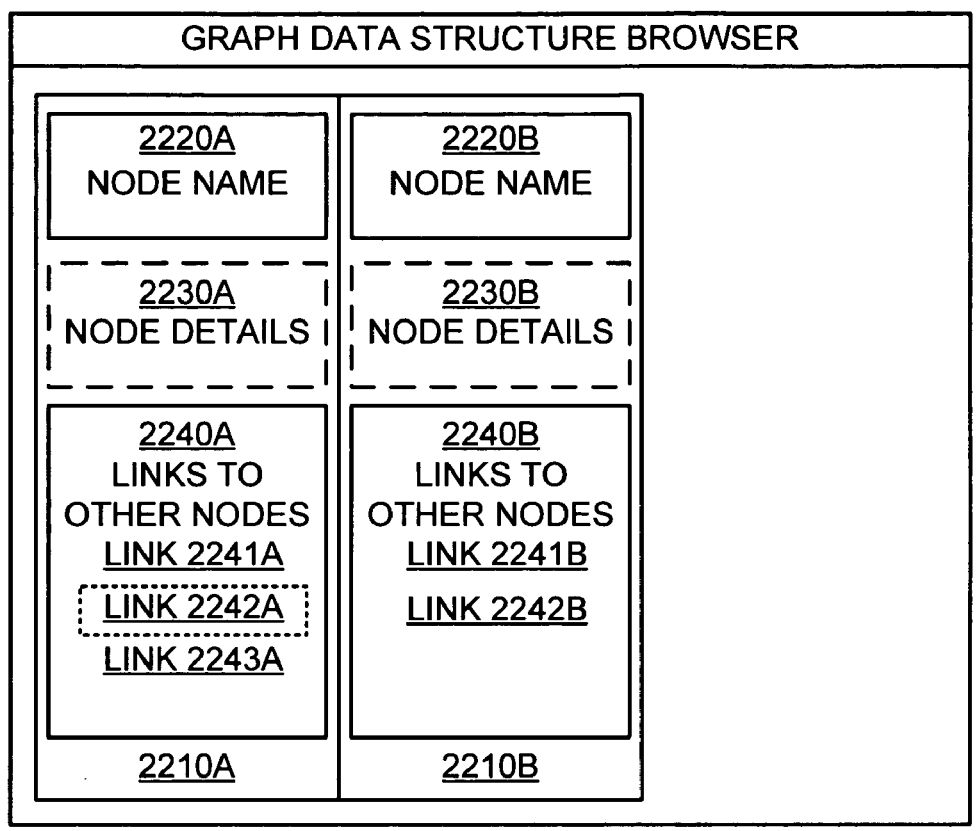
FIG. 23 is a screen shot showing an exemplary user interface implementing a graph data structure browser showing two panes, after having navigated within the graph data structure with the user interface shown in FIG. 22.

FIG. 23 shows the user interface 2200 of FIG. 22 after the user has activated link 2242A as user interface 2300. As a result, the node corresponding to the link 2242A is displayed in the adjacent pane 2210B (e.g., along with node name 2220B, node details 2230B, and links to other nodes 2240B (e.g., links 2241B and 2242B)).

Example 42

Figure 24:
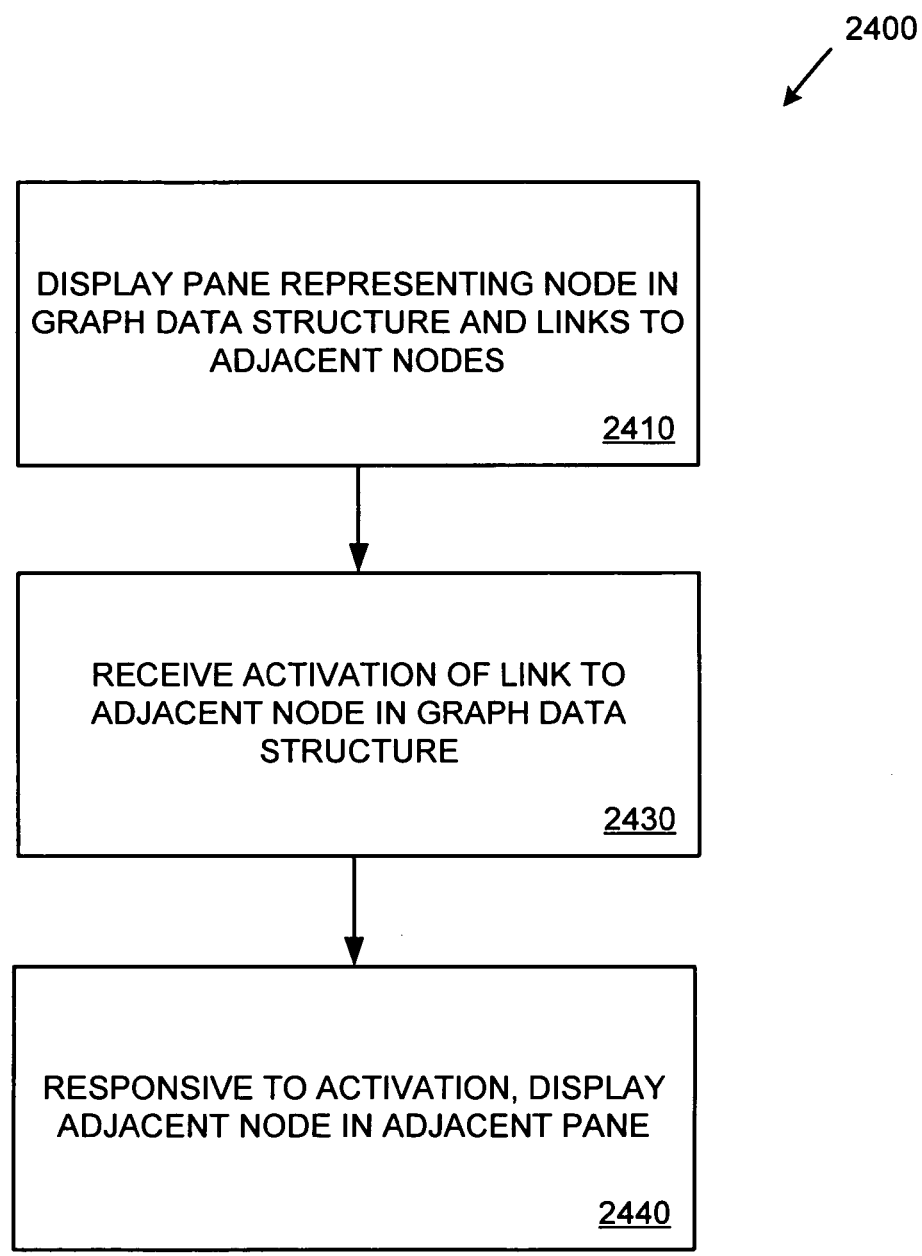
FIG. 24 is a flowchart showing an exemplary method of navigating within a graph browser such as those shown in FIGS. 21A, 22, 23, and 25.

Exemplary Method for Generating User Interfaces Presented by a Graph Browser FIG. 24 shows an exemplary method 2400 of navigating within a graph browser such as those shown in FIGS. 21A, 22, 23, and 25.

In the example, at 2410, a pane representing a node in the graph data structure and links to adjacent nodes are displayed. At 2430, an activation of one of the links to an adjacent node in the graph data structure is received. Then, at 2440, responsive to activation, information for the adjacent node is displayed in an adjacent pane.

Example 43

Exemplary Interfaces Presented by a Graph Browser

Figure 25:
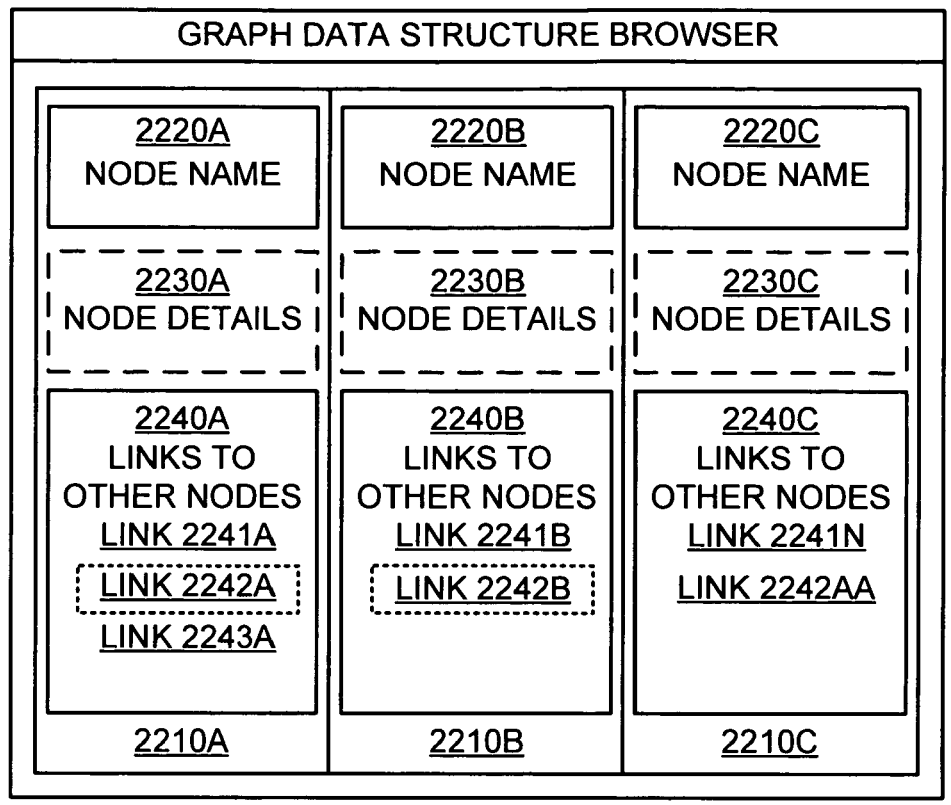
FIG. 25 is a screen shot showing an exemplary user interface implementing a graph data structure browser showing three panes.

FIG. 25 shows a user interface 2500 depicting the user interface 2300 of FIG. 23 after the user has activated the link 2242B. As a result, the node corresponding to the link 2242B is displayed in the adjacent pane 2210C (e.g., along with node name 2220C, node details 2230C, and links to other nodes 2240C (e.g., links 2241N and 2242AA, which links to the same node as the link 2242A)).

Figure 26A:
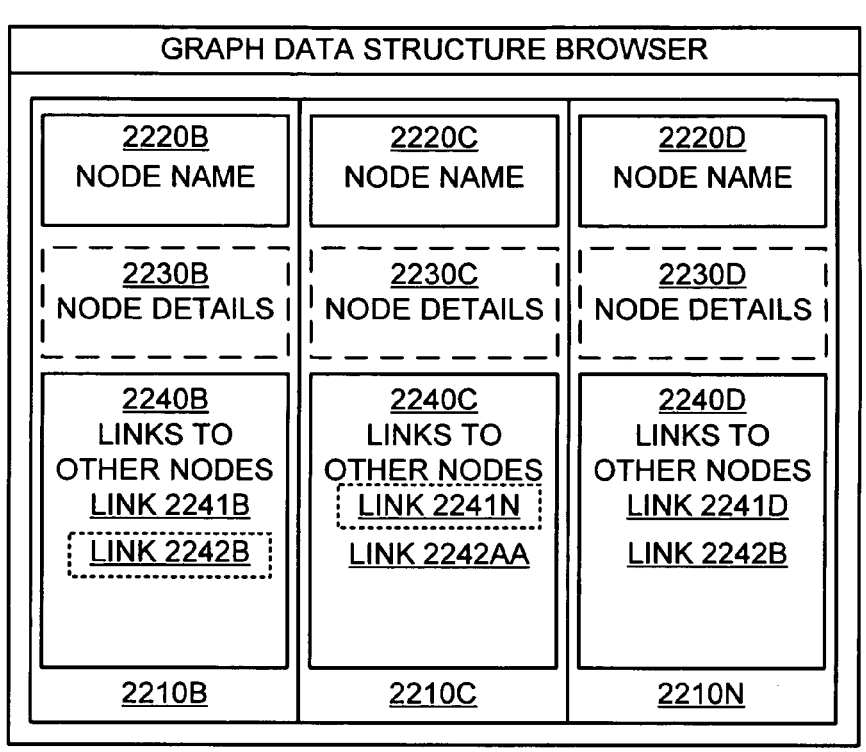
FIG. 26A is a screen shot showing an exemplary user interface implementing a graph data structure browser showing three panes, after having navigated within the graph data structure with the user interface shown in FIG. 25.

FIG. 26A shows the user interface 2600 depicting the user interface 2500 of FIG. 25 after the user has activated the link 2241N. As a result, the node corresponding to the link 2241N is displayed in the adjacent pane 2210D. Because the browser has been configured to display three panes, the earliest-most (e.g., left-most) pane can no longer fit in the interface and is discarded (e.g., no longer shown). The panes have been shifted (e.g., to the left).

Instead of simply discarding the pane, a back button can be provided by which the pane will be recovered after temporarily removing it from the interface. Alternatively, a smaller version of the pane (e.g., a panelet such as a strip, header, or title, such as node name) can be shown instead of discarding it. In such a way, the panelets can stack on top of each other like a hand of playing cards.

Figure 26B:
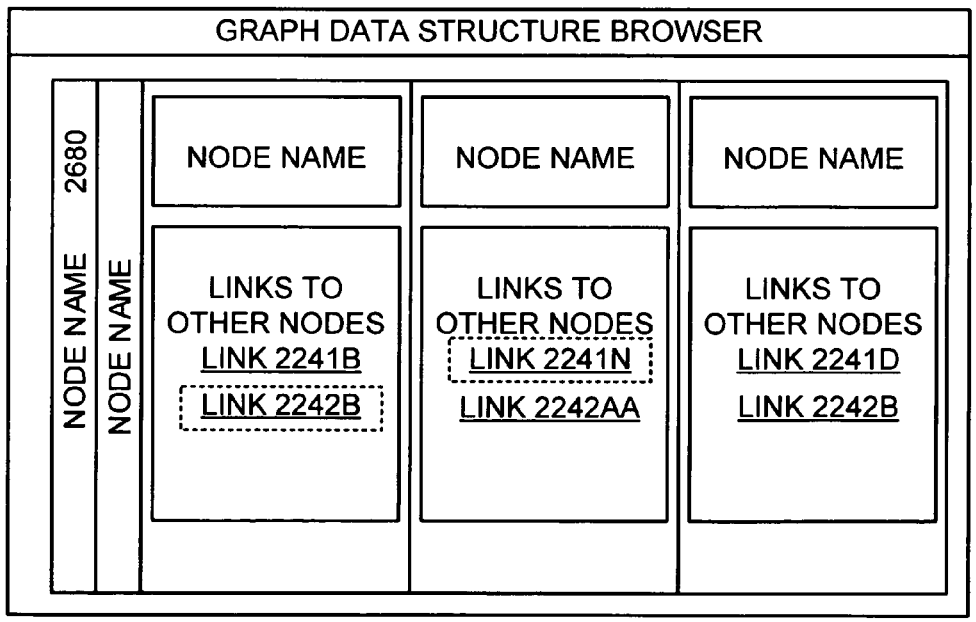
FIG. 26B is a screen shot showing an exemplary stacking of panes within a graph browser.

FIG. 26B shows such an exemplary stacking of nodes after a threshold number of panes has been met. Activating one of the stacked panelets 2680 (e.g., by clicking on it) can cause the panelet to be restored to original size and gain the current focus (e.g., as a pane from which additional links can be selected).

Example 44

Exemplary Method for Generating Interfaces Presented by a Graph Browser

Figure 27:
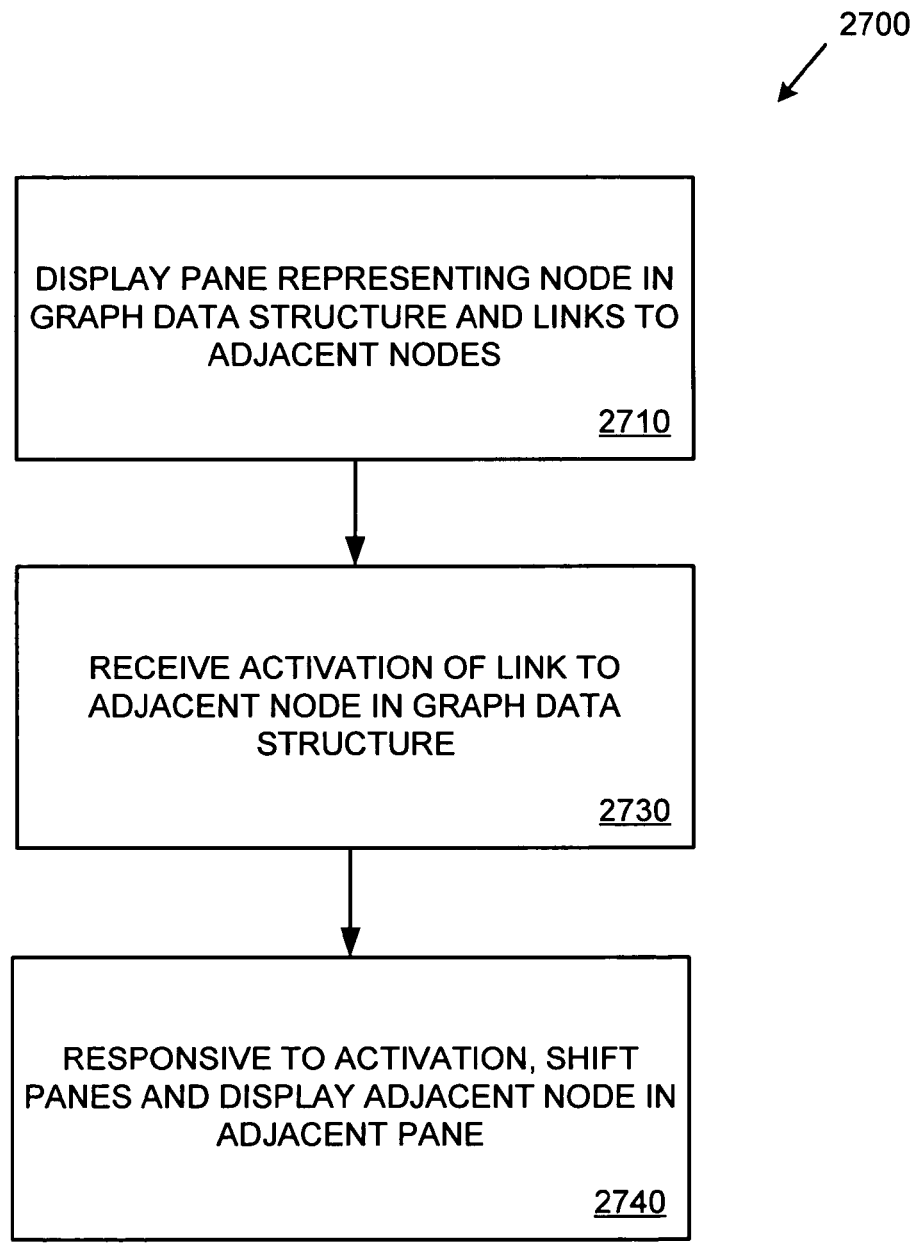
FIG. 27 is a flowchart showing an exemplary method of shifting panes within a graph browser, as shown in the user interface of FIG. 26.

FIG. 27 shows an exemplary method 2700 of shifting panes within a graph browser, such as shown in the user interface of FIG. 26.

In the example, a pane representing a node in the graph data structure and links to adjacent nodes are displayed at 2710. At 2730, an activation of a link in the pane to an adjacent node in the graph data structure is received. At 2740, responsive to the activation (e.g., and determining that no more panes will fit), the panes are shifted and the adjacent node is displayed in an adjacent pane. The earliest displayed (e.g., leftmost) pane can be discarded. Thus, the panes can be shifted and at least one of the panes discarded upon reaching a threshold number of panes. A method supporting panelets can also be implemented.

Example 45

Exemplary Additional User Interface Features for Browser

In any of the examples described herein, a graph data structure browser can include additional features. For example, selecting a link in an earlier pane, after subsequent panes have already been shown can cause the subsequent panes to disappear, and a pane for the selected node to appear adjacent to the earlier pane. For example, with reference to FIG. 25, selecting the link 2541A would cause the two panes 2510B and 2510C to disappear, and a pane for the node related to the link 2541A would appear adjacent to the pane 2510A (e.g., in place of the pane 2510B). Selecting the link 2541B would have a similar effect.

Example 46

Exemplary User Interface

Figure 28:
FIG. 28 is a screen shot showing an exemplary user interface implementing a graph browser to browse a graph data structure constructed according to the technologies described herein.

FIG. 28 shows an exemplary user interface 2800 for browsing a graph data structure. In the example, a three-pane 2820A, 2820B, 2820C graph browser is shown, which can be presented via any of the techniques described herein. In the example, the browsing technology has been applied to a graph data structure representing software development items and the relationships therebetween.

Example 47

Exemplary Computing Environment

Figure 29:
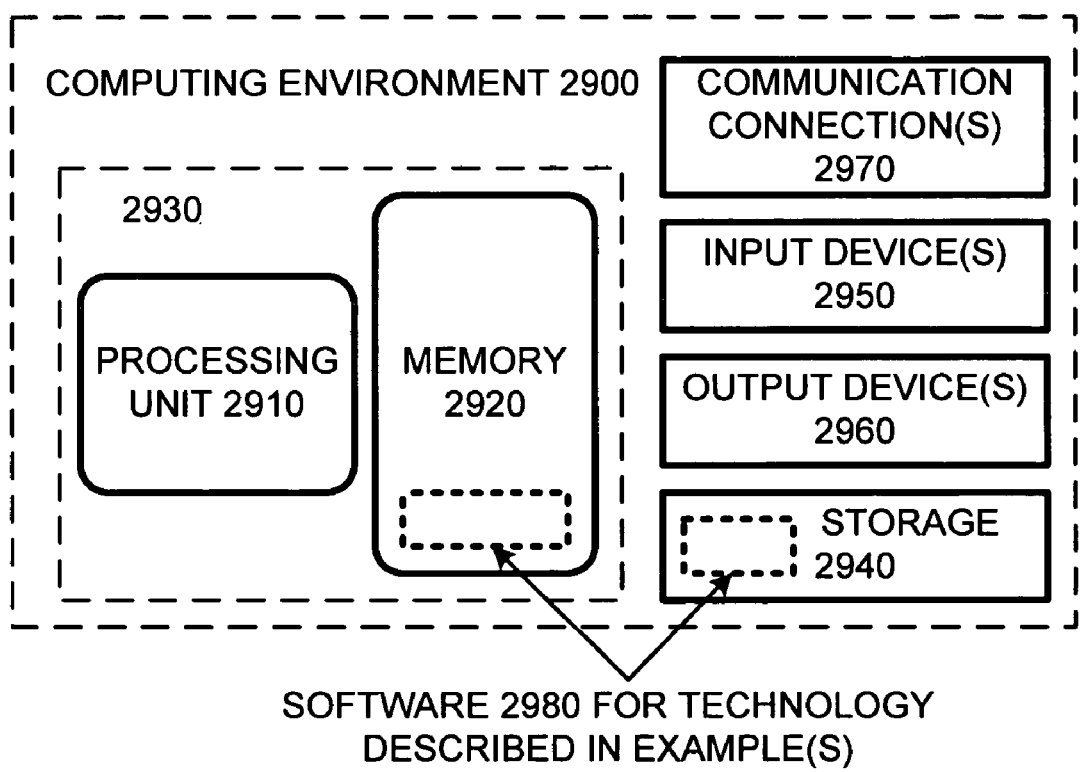
FIG. 29 is a block diagram of an exemplary suitable computing environment for implementing described implementations.

FIG. 29 illustrates a generalized example of a suitable computing environment 2900 in which the described techniques can be implemented. The computing environment 2900 is not intended to suggest any limitation as to scope of use or functionality, as the technologies may be implemented in diverse general-purpose or special-purpose computing environments.

With reference to FIG. 29, the computing environment 2900 includes at least one processing unit 2910 and memory 2920. In FIG. 29, this most basic configuration 2930 is included within a dashed line. The processing unit 2910 executes computer-executable instructions and may be a real or a virtual processor. In a multi-processing system, multiple processing units execute computer-executable instructions to increase processing power. The memory 2920 may be volatile memory (e.g., registers, cache, RAM), non-volatile memory (e.g., ROM, EEPROM, flash memory, etc.), or some combination of the two. The memory 2920 can store software 2980 implementing any of the technologies described herein.

A computing environment may have additional features. For example, the computing environment 2900 includes storage 2940, one or more input devices 2950, one or more output devices 2960, and one or more communication connections 2970. An interconnection mechanism (not shown) such as a bus, controller, or network interconnects the components of the computing environment 2900. Typically, operating system software (not shown) provides an operating environment for other software executing in the computing environment 2900, and coordinates activities of the components of the computing environment 2900.

The storage 2940 may be removable or non-removable, and includes magnetic disks, magnetic tapes or cassettes, CD-ROMs, CD-RWs, DVDs, or any other computer-readable media which can be used to store information and which can be accessed within the computing environment 2900. The storage 2940 can store software 2980 containing instructions for any of the technologies described herein.

The input device(s) 2950 may be a touch input device such as a keyboard, mouse, pen, or trackball, a voice input device, a scanning device, or another device that provides input to the computing environment 2900. For audio, the input device(s)

2950 may be a sound card or similar device that accepts audio input in analog or digital form, or a CD-ROM reader that provides audio samples to the computing environment. The output device(s) 2960 may be a display, printer, speaker, CD-writer, or another device that provides output from the computing environment 2900.

The communication connection(s) 2970 enable communication over a communication medium to another computing entity. The communication medium conveys information such as computer-executable instructions, audio/video or other media information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Communication media can embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. Communication media include wired media such as a wired network or direct-wired connection, and wireless media such as acoustic, RF, infrared and other wireless media. Combinations of any of the above can also be included within the scope of computer readable media.

The techniques herein can be described in the general context of computer-executable instructions, such as those included in program modules, being executed in a computing environment on a target real or virtual processor. Generally, program modules include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing environment.

Methods in Computer-Executable Media

Any of the methods described herein can be implemented by computer-executable instructions in one or more computer-readable media.

ALTERNATIVES

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. I therefore claim as my invention all that comes within the scope and spirit of these claims.

I claim:

1. One or more computer-readable storage media having computer-executable instructions for performing a method comprising:
receiving a request to indicate software development items related to a specified software development item;
responsive to the request, inspecting a data structure representing software development items as a plurality of nodes in a graph data structure, wherein the specified software development item is represented as one of the nodes in the graph data structure;
detecting at least one relationship for a plurality of the software development items represented in the graph data structure;
responsive to detecting the relationship, representing the detected relationship in the graph data structure; and
presenting results indicating the software development items having nodes connected in the data structure to the node representing the software development item in the graph data structure for the specified software development item;
wherein the presenting ranks the software development items according to distance from one or more nodes meeting specified criteria; and
wherein the computer-readable storage media further comprise computer-executable instructions for performing at least one selected from the group consisting of:
weighting the distance based on edge cost within the graph data structure; and
ranking based at least on a number of edges incident to an intervening node between two nodes.

2. The one or more computer-readable media of claim 1 wherein:
the detecting comprises detecting relationships in a plurality of disconnected data collections;
whereby the graph data structure represents the relationships detected in the plurality of disconnected data collections.

3. The one or more computer-readable media of claim 2 wherein:
at least one of the disconnected data collections is an email database; and
at least one of the disconnected data collections is a non-email database.

4. The one or more computer-readable media of claim 1 wherein:
the graph data structure comprises heterogeneous nodes of different object classes representing respective different kinds of software development items.

5. The one or more computer-readable media of claim 4 wherein:
the different object classes inherit from a same parent object class in a class hierarchy.

6. The one or more computer-readable media of claim 1 wherein:
the software development items comprise at least one software developer;
at least one of the nodes represents the software developer; and
at least one node representing the software developer shares an edge with at least one other node representing a software development item other than a software developer.

7. The one or more computer-readable media of claim 1 wherein:
the detecting comprises recognizing that a software development item has been mentioned in plain text; and
representing the detected relationship comprises modifying the graph data structure to indicate a relationship for the mentioned software development item.

8. The one or more computer-readable media of claim 7 wherein:

the detecting comprises recognizing that at least one selected from the following group has been mentioned in plain text:
an object class;
a method of an object class;
a structure; and
an enumerated type.

9. The one or more computer-readable media of claim 7 wherein:
the plain text appears in an email sent by a developer; and
representing the detected relationship comprises modifying the graph to indicate a relationship between the mentioned software development item and the developer.

10. The one or more computer-readable media of claim 1 wherein:
the graph data structure comprises at least one node representing a bug;
the detecting comprises recognizing that a software development item has been mentioned in plain text of a bug report for the bug; and
representing the detected relationship comprises modifying the graph data structure to indicate a relationship between the mentioned software development item and the bug.

11. One or more computer-readable storage media having computer-executable instructions for performing a method comprising:
receiving a request to indicate software development items related to a specified software development item;
responsive to the request, inspecting a data structure representing software development items as a plurality of nodes in a graph data structure, wherein the specified software development item is represented as one of the nodes in the graph data structure; and
presenting results indicating the software development items having nodes connected in the graph data structure to the node representing the software development item in the graph data structure for the specified software development item;
wherein the presenting ranks the software development items according to distance from one or more nodes meeting specified criteria; and
wherein the computer-readable storage media further comprise computer-executable instructions for performing an action selected from the group consisting of:
weighting the distance based on edge cost within the graph data structure; and
ranking based at least on a number of edges incident to an intervening node between two nodes.

12. The one or more computer-readable media of claim 11 wherein:
the request is implicitly generated based on non-query user activity inside an application without an explicit query action by a user.

13. The one or more computer-readable media of claim 11 wherein:
the request indicates that results are to be limited to a particular type of software development item; and
responsive to the request, the presenting presents results limited to the particular type of software development item.

14. The one or more computer-readable storage media of claim 11, wherein the method comprises:
weighting the distance based on edge cost within the graph data structure.

15. The one or more computer-readable storage media of claim 11, wherein the computer-readable storage media comprise computer executable instructions for ranking based at least on a number of edges incident to an intervening node between two nodes.

* * * * *